(12) United States Patent
McArthur et al.

(10) Patent No.: US 7,141,321 B2
(45) Date of Patent: *Nov. 28, 2006

(54) SYSTEM AND METHOD FOR ENABLING THE REAL TIME BUYING AND SELLING OF ELECTRICITY GENERATED BY FUEL CELL POWERED VEHICLES

(75) Inventors: Grant McArthur, Toronto (CA); Aaron Hardwick, Thorold (CA)

(73) Assignee: Hydrogenics Corporation, Mississauga (CA)

( * ) Notice: Subject to any disclaimer, the term of this patent is extended or adjusted under 35 U.S.C. 154(b) by 317 days.

This patent is subject to a terminal disclaimer.

(21) Appl. No.: 10/725,546

(22) Filed: Dec. 3, 2003

(65) Prior Publication Data

US 2004/0110044 A1    Jun. 10, 2004

Related U.S. Application Data

(63) Continuation of application No. 09/808,042, filed on Mar. 15, 2001, now Pat. No. 6,673,479.

(51) Int. Cl.
*H01M 8/00* (2006.01)
*B60L 11/18* (2006.01)

(52) U.S. Cl. .................. 429/12; 429/13; 180/65.3; 705/28; 705/412

(58) Field of Classification Search .............. 429/12, 429/13, 17, 19, 20, 22, 23, 24, 25; 180/65.3; 705/28, 412

See application file for complete search history.

(56) References Cited

U.S. PATENT DOCUMENTS

| 3,894,242 | A | 7/1975 | Helling |
|---|---|---|---|
| 4,507,720 | A | 3/1985 | Colbrese |
| 4,751,151 | A | 6/1988 | Healy et al. |
| 4,931,947 | A | 6/1990 | Werth et al. |
| 4,961,151 | A | 10/1990 | Early et al. |
| 4,962,462 | A | 10/1990 | Fekete |
| 5,023,150 | A | 6/1991 | Takabayashi |
| 5,318,142 | A | 6/1994 | Bates et al. |
| 5,332,630 | A | 7/1994 | Hsu |
| 5,334,463 | A | 8/1994 | Tajima et al. |
| 5,432,710 | A | 7/1995 | Ishimaru et al. |
| 5,434,015 | A | 7/1995 | Yamada et al. |

(Continued)

FOREIGN PATENT DOCUMENTS

EP    0755088    1/1997

(Continued)

*Primary Examiner*—Stephen J. Kalafut
(74) *Attorney, Agent, or Firm*—Bereskin & Parr

(57) ABSTRACT

The present invention relates to a network communication system and method to enable the real time buying and selling of electricity generated by fuel cell powered vehicles between a fuel cell powered vehicle and a consumer. The method comprises: providing connections to the vehicle for the supply of a fuel and for transfer of electricity; determining the current cost of fuel and price paid for generating electricity; based at least on the cost of fuel and price paid for generating electricity, determining whether to make the fuel cell powered vehicle available for generation of electricity; when fuel is consumed by the vehicle and electricity generated by the vehicle, collecting data on the quantity of fuel consumed and amount of electricity generated, calculating the cost of the fuel and the value of the electricity generated, providing a debit charge for the cost of fuel consumed and a credit charge for the value of electricity generated. A method to enable the real time buying and selling of electricity generated by fuel cell powered vehicles between an energy service provider and a consumer of electricity is also disclosed.

64 Claims, 7 Drawing Sheets

U.S. PATENT DOCUMENTS

| | | |
|---|---|---|
| 5,462,815 A | 10/1995 | Horiuchi |
| 5,532,573 A | 7/1996 | Brown et al. |
| 5,563,802 A | 10/1996 | Plahn et al. |
| 5,631,532 A | 5/1997 | Azuma et al. |
| 5,646,852 A | 7/1997 | Lorenz et al. |
| 5,684,379 A | 11/1997 | Svedoff |
| 5,767,584 A | 6/1998 | Gore et al. |
| 5,794,212 A | 8/1998 | Mistr, Jr. |
| 5,858,568 A | 1/1999 | Hsu et al. |
| 6,047,274 A | 4/2000 | Johnson et al. |
| 6,107,691 A | 8/2000 | Gore et al. |
| 6,380,637 B1 | 4/2002 | Hsu et al. |
| 6,420,060 B1 | 7/2002 | Yamamoto et al. |
| 6,503,649 B1 | 1/2003 | Czajkowski et al. |
| 6,522,955 B1 | 2/2003 | Colborn |
| 6,673,479 B1 * | 1/2004 | McArthur et al. ............ 429/12 |
| 6,898,710 B1 * | 5/2005 | Aull ........................... 713/182 |

FOREIGN PATENT DOCUMENTS

| | | |
|---|---|---|
| GB | 2352886 A | 7/2001 |
| WO | WO 93/09572 | 5/1993 |
| WO | WO 98/12763 | 3/1998 |
| WO | WO 99/30412 | 6/1999 |

\* cited by examiner

SYSTEM AND METHOD FOR ENABLING THE REAL TIME BUYING AND SELLING OF ELECTRICITY GENERATED BY FUEL CELL POWERED VEHICLES

RELATED APPLICATIONS

This application is a continuation of pending U.S. patent application Ser. No. 09/808,042 filed Mar. 15, 2001, now U.S. Pat. No. 6,673,479, the contents of which are herein incorporated by reference.

FIELD OF THE INVENTION

The present invention relates to a network communication system and method to enable the real time buying and selling of electricity generated by fuel cell powered vehicles and/or stationary fuel cells.

BACKGROUND OF THE INVENTION

There are many serious environmental concerns regarding internal combustion engines employed in motor vehicles. Such engines cause irreversible pollution, operate at low efficiencies, and require the combustion of non-renewable fossil fuels. In response to this pollution crisis, car manufacturers are working diligently at developing alternative energy systems, which do not require combustion reactions.

Alternatives to internal combustion engine powered motor vehicles have included various types of electric vehicles. Typical electrical vehicles are powered by nickel cadmium batteries which are rechargeable by stationary direct current power supplies. These systems suffer from many disadvantages. Since the batteries require constant recharging, these cars are not well suited for driving long distances. Additionally, these types of cars generally are not adapted for highway driving, as they are considered to be underpowered. Moreover, due to the weight of the batteries, these types of cars tend to be heavy, which in turn impairs their performance. With current technology, such electronically powered cars are prohibitively expensive.

Various hybrid vehicles have been proposed. Typically, hybrid vehicles have two power sources and are intended to improve overall fuel efficiency. A basic design principle for many hybrid vehicles is based on the concept that power demands for a car or another vehicle fluctuate over a wide range; thus, the intention is to provide one, efficient power source that provides a certain base power requirement and another power source that provides the additional power required to meet peak power requirements.

One type of hybrid vehicle utilizes a combination of a fuel cell and an internal combustion engine to provide sufficient power to propel the vehicle. However, using current technology, such vehicles are expensive to manufacture and operate. Furthermore, since a typical vehicle is only used for a small fraction of the time, the fuel cell is underutilized. Accordingly, without a secondary use for the fuel cell, the high capital cost of the fuel cell is not justified.

Different types of fuel cells including proton exchange membranes, solid oxides, high temperature fuel cells, and regenerative fuel cells have been explored for use in motor vehicles. Currently, most of the research is directed towards a proton exchange membrane fuel cell comprising an anode, a cathode, and a selective electrolytic membrane disposed between the two electrodes. In a catalyzed reaction, a fuel such as hydrogen is oxidized at the anode to form cations (protons) and electrons. The ion exchange membrane facilitates the migration of protons from the anode to the cathode. The electrons cannot pass through the membrane and are forced to flow through an external circuit thus providing an electrical current. At the cathode, oxygen reacts at the catalyst layer, with electrons returned from the electrical circuit, to form anions. The anions formed at the cathode react with the protons that have crossed the membrane to form liquid water as the reaction product. Typically, a combustion reaction is not involved. Accordingly, fuel cells are clean and efficient.

One drawback associated with the known prior art fuel cell systems, however, is that they are not economically viable for use in a vehicle. Typically a vehicle requires a fuel cell with a power rating of at least 20 kW to be able to meet propulsion demands. Given the current production costs for fuel cells, a fuel cell power unit of sufficient size for a car represents a significant investment and in effect, greatly increases the initial cost of the car. Even though there are significant fuel cost savings with a fuel cell power unit, the ongoing savings throughout the lifetime of the car do not justify the higher initial capital costs of current fuel cell technology.

Several proposals for addressing this problem can be found in issued patents. U.S. Pat. No. 5,858,568 provides for off-board use of the electricity generated from at least one stationary fuel cell powered vehicle. U.S. Pat. No. 5,767,584 and U.S. Pat. No. 6,107,691 both disclose inventions for generating electrical power from multiple stationary fuel cell powered vehicles parked in a parking lot. All of these inventions are based on the realization that a fuel cell power unit of a car represents a significant power source, and unlike a conventional combustion engine, can efficiently generate electrical power that can be readily taken off the vehicle for use elsewhere. Furthermore, a fuel cell can generate electricity virtually free of pollution, whereas an internal combustion engines, produces greenhouse gases which contributes to acid rain. Moreover, unlike conventional gas engines, the wear and tear from additional use of a fuel cell is quite small. Thus with suitable financial incentives, it is believed that vehicle owners would effectively be prepared to rent out the power unit of a vehicle simply as an electrical generator, when the vehicle is not in use. Payments made for use of a vehicle's fuel cell power unit effectively provides the subsidies necessary to justify the higher initial capital costs of the fuel cell powered vehicle. A further consideration is that fuel cell engines are powerful, typically in the range of 20 kw to 40 kw, so that the power of the order of Megawatts would be generated from a small number of vehicles. To enable power to be recovered from a large number of vehicles, the intention is to provide a suitable facility at a parking lot or the like.

According to U.S. Pat. No. 6,107,691, a parking lot is equipped with individual docking stations, each providing a fuel line, and an electrical receptacle for connection to an electric cable. An electric power grid is electrically connected to the electrical receptacles in the parking lot for transferring direct current (DC) electrical power from the fuel cells in the parked vehicles to an electric power collection station. The electric power collection station is then electrically connected to the electrical power grid for transfer of electric power after conversion to alternating current (AC) to the end user. At least one inverter is provided in the electric power collection station for converting the DC electric power to AC electric power. In this distributed energy system, parked vehicles can be operated and the resulting energy harnessed and distributed through an electric power grid to provide electrical power for local or distant use.

Although the known prior art systems describe some of the technical aspects of the distributed energy system, these known proposals do not specifically address the overall communication system and method required for this system to work properly and efficiently; in particular, they fail to provide systems and methods for accounting for fuel used and electricity generated. Clearly, as compared with any fixed generating plant, a vehicle-borne fuel cell unit is mobile, and this presents unique requirements such as identifying the vehicle, and providing metering and billing for fuel consumed and electricity generated by the vehicle. Without an overall communication network, it is conceivable that the participants in such a scheme would have to separately negotiate contracts before receiving all of the relevant information. For example, an owner of a fuel cell powered vehicle may have to set or agree to an electricity supply price, or vice versa a fuel price. In this scenario, the fuel cell powered vehicle faces a disadvantage of having to negotiate a contract without all of the relevant information required for economic power generation. This type of uncertainty leads to an inefficient energy market. Additionally, there would be substantial accounting and record keeping complexities.

Conventionally many utilities, such as electricity, gas and the like have been distributed by large companies, which often have a monopoly for distribution in a particular area. Additionally, pricing for energy supplies such as electricity has been inflexible and based on long term contracts. For example, the price of electricity is set, and in many jurisdictions, is subject to government regulation, for time periods of the order of months or years.

More recently, the concept of 'distributed generation' is becoming recognized. Generally, 'distributed generation' is seen as the supply of electricity at a point closer to the consumer than traditional power plants thus reducing the requirements for electricity transmission and optimizing power plant system efficiencies. Distributed power plants could provide power to a single user or to an entire grid, but in either case are typically expected to be a few orders of magnitude smaller in power output than centralized power plants.

Many people believe that distributed generation will change the format of the electricity grid in the $21^{st}$ century, as the consumer gains more control over their electricity choices in source(s), distribution and transmission. The technology used for distributed generation, coupled with the Internet, provides a unique opportunity to enhance the efficiency of the electrical power industry.

A distributed power plant system that is optimized using currently available technologies could be described in numerous ways. For example, a high efficiency, low emission vehicle-borne fuel cell can provide the basic power source for a vehicle; additionally, it could be used to provide power to the grid during non-driving periods. Such a concept would enable more efficient use of existing technologies and vehicles. These fuel cell-powered vehicles would require a fuel to operate (hydrogen in its simplest form) and could utilize any fossil fuels containing hydrogen (e.g. natural gas or methanol) either on board or from a central generating station for this purpose. With a suitable interconnection device, these cars can be plugged in wherever they are parked, for example at the owners place of employment, and could be refueled and provide power at the same time to the main grid (for centralized distribution) and for their specific location (distributed generation, UPS and high reliability in the order of 99.9999% of power generation).

Other technologies for distributed generation could include diesel generators, micro-turbines, wind, solar and hybrid combinations of these generators. However, the main interest of the present invention pertains to vehicular fuel cells. Nonetheless, it should be recognized that, in any distributed generation scheme, fuel cells are unlikely to be the sole source of distributed generation power.

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a cooling medium. Also within the stack are current collectors, cell-to-cell seals and insulation, with required piping and instrumentation provided externally of the fuel cell stack. The stack, housing, and associated hardware make up the fuel cell module.

However, the present invention provides for an extension of the typical fuel cell stack whereby, in addition to connecting the fuel cells in series, stacked one on top of the other or placed side by side, the fuel cells become connected through the grid and the Internet, forming a meta-network of energy generation.

Fuel cells may be classified by the type of electrolyte, either liquid or solid. The present invention can apply to any type of fuel cell.

The fuel commonly used for such fuel cells is hydrogen, or hydrogen rich reformate from other fuels ("reformate" refers to a fuel derived by reforming a hydrocarbon fuel into a gaseous fuel comprising hydrogen and other gases). Alternatively, the hydrogen may be generated by one or a combination of the sources, including, but not limited to, wind, solar, bacteria, nuclear, hydroelectric, cold fusion, methane derived from coal beds, or methane hydrate from the ocean floor. Hydrogen could also be generated by electrolysis, but clearly as the present invention essentially proposes consuming hydrogen to generate electricity, this will likely only be commercially feasible where hydrogen can be generated economically using cheap, off-peak electricity, stored, and then used to generate electricity during a peak rate period. The oxidant on the cathode side can be provided from a variety of sources. For some applications, it is desirable to provide pure oxygen, in order to make a more compact fuel cell, reduce the size of flow passages, etc. However, it is common to provide air as the oxidant, as this is readily available and does not require any separate or bottled gas supply. Moreover, where space limitations are not an issue, e.g. stationary applications and the like, it is convenient to provide air at atmospheric pressure. In such cases, it is common to simply provide channels through the stack of fuel cells for flow of air as the oxidant, thereby greatly simplifying the overall structure of the fuel cell assembly. Rather than having to provide a separate circuit for oxidant, the fuel cell stack can be arranged simply to provide a vent, and possibly, some fan or the like, to enhance air flow.

The fuel can be supplied from fossil fuels but needs to be converted to hydrogen before use in the fuel cell. This conversion is typically performed with some sort of reformer. Presently, there are three general types of reformers: partial oxidation, auto thermal and steam. These reformers vary greatly with respect to operating conditions, size, efficiency, etc. However, a reformer is required with any fuel cell system when hydrocarbon fuel is used.

A fuel cell operates at its highest efficiency while idling or supplying minimal power, in contrast to internal combustion engines, which operate at their lowest efficiency while idling or supplying minimal power. In a fuel cell, as the power output increases to the peak output power, the efficiency correspondingly decreases. Fuel cells operating at low utilization offer advantages over traditional power plants because they will generate power at potentially higher efficiencies than these power plants. Using the United States as an example, the total amount of electrical power required for industrial and residential use is provided repeatedly by new car production every year. Consequently, the concept of underutilized, high efficiency fuel cells becomes attractive for distributed generation. In fact, a grid supported primarily by many parked vehicular distributed generation plants may be the future of the energy industry, and may replace most if not all of central generation. Even a relatively small number of vehicles could provide the equivalent of 1 MW of power, over a large number of locations.

Accordingly, there exists a need for a network communication system and method for enabling the real time buying and selling of electricity generated by fuel cell powered vehicles parked in a parking lot or the like. Specifically, there is a need for a system and method for energy trading that provides for: proper metering and billing for fuel used and energy generated; timely and accurate communication between all of the participants; and, availability of unbiased information to all of the participants.

SUMMARY OF THE INVENTION

What the present invention realizes is that the use of vehicle-borne fuel cells and/or stationary fuel cells as power sources offers advantages that have not yet been realized, and includes unique issues in the business method that need to be addressed for such a scheme to be fully realized.

The advantages come from the fact that fuel cells offer an interruptible power supply that can be readily turned on and off. This is in complete contrast to most conventional power sources, as they typically cannot be switched in and out of the grid on controlled time scales.

This in turn should more readily enable pricing of electricity to be varied on short time scales, possibly of the order of fractions of hours, minutes, or in a real time. More significantly, this can affect both consumers and generators, both at the retail/consumer level, and the wholesale level. In contrast, while there is currently real time trading in electricity supplies, this usually occurs between energy service providers, distribution companies, utilities and large industrial users. Smaller individual consumers, whether residential, commercial or light industrial users typically enter into a contract with a utility, distribution company, energy service provider or independent power producer (IPP) for supply of electricity at an average or contracted market price.

The present invention then recognizes that you would then have a situation where a significant portion of the electricity generated could be from devices, e.g. fuel cells, capable of rapid and interruptible response. If one further factors in that, as yet another aspect of the present invention, costs, for both consumption and generation of electricity, could be communicated instantaneously in real time to both consumers and generators, then there is a possibility of providing for real time modification of the behavior of both consumers and generators to meet current electricity demand.

In effect, if demand for electricity increases significantly, this can be relayed or transmitted by notifying both consumers and generators of an increased price. This should encourage more people to make vehicle-borne fuel cells and/or stationary fuel cells available for generation of electricity, while at the same time might encourage consumers to turn off, or defer use of, high consumption appliances which are capable of instantaneous or rapid interruption, i.e. they can be turned on or off quickly. Correspondingly, during periods of low electricity demand, e.g. during the night, prices are usually lowered, thereby encouraging users of electricity to switch demand to such a low use period where possible, while encouraging owners of fuel cell powered vehicles to use their vehicles during these periods.

What the earlier prior art proposals identified above failed to address is the whole issue of accounting for fuel consumed and electricity generated, when a vehicle-borne fuel cell and/or a stationary fuel cell is used to generate electricity. For any fixed generating station, however small, the operator of the station is usually responsible for obtaining and paying for fuel required to run the station, and it is a simple matter to record and account for electricity generated and supplied to a distribution grid. Where electricity is generated by vehicle-borne fuel cells and/or stationary fuel cells, there is a whole different set of issues to be addressed. Firstly, the number of different "generating stations" becomes many orders of magnitude greater, quite conceivably of the order of millions in North America.

Each fuel cell powered vehicle operates as a small, movable generating station. Where, as detailed below, it might be plugged into a docking station in a parking lot or the like, fuel would be supplied by some third party supplier and electricity generated would flow to an adjacent residence, commercial or industrial user or flow back onto the grid, either individually or via an aggregator of electricity for dispatch onto the grid. Additionally, stationary fuel cells located in residences can also be operated to deliver power to the grid. This presents new and unique requirements in terms of accounting for fuel used and electricity generated. If one factors in the additional parameter of potentially rapidly varying prices for electricity, and even fuel, the communication, control and record keeping issues become significant.

More significantly, the present inventors have realized that the features of the present invention provide the missing elements to provide a more liquid market by enabling more depth and breadth of the electricity market. Additionally, the present invention recognizes that it will likely be employed in an environment where the cost of fuel may well be fluctuating on a short time scale. In contrast, the earlier proposals outlined above, namely U.S. Pat. Nos. 5,858,568, 5,767,584, and 6,107,691, fail to address any of these issues, and, practically, could only be employed in an environment where the cost of fuel used and electricity generated can be taken to be constant for significant time periods.

For a vehicle owner where the price paid for electricity generated and the cost of fuel supplied can both be varying, this presents unique problems. Firstly, there is the problem of communicating this information in a timely manner to the participants. Secondly, there is the problem of making a decision of when to actuate the vehicle's fuel cell and when not to use it. Thirdly, there is the problem of properly accounting for the credits and debits for the participants in the scheme given the rapidly fluctuating fuel and electricity prices.

By way of general overview, one aspect of the present invention provides a parking lot which is adapted to harness electrical power from a plurality stationary fuel cells and/or fuel cell powered vehicles. For example, the vehicles could be parked in a parking lot or the like. Specifically, the parking lot contains a plurality of individual docking stations, which have connections to the vehicles for the supply of a fuel and for transfer of electricity to an electrical power grid. From the vehicles, the generated power travels to an aggregation unit, which physically aggregates the power, harnessed from the fuel cell powered vehicles. The resultant electrical energy can be used in one of two ways. The aggregation unit can be controlled by an energy service provider to send a DC power supply directly to end users through a local DC power grid. DC power is limited to local usage due to the losses which occur during long distance transmission through a DC grid. Alternatively, the aggregation unit can be controlled by the energy service provider to provide an inverter for the electricity, and ultimately supply the alternating current (AC) into an AC power grid for local or distant use. It is to be understood that in some cases, the owner of the aggregation unit and the energy service provider will be the same entity. A real time network connects: a fuel supplier, which would be delivered through a distribution company, but can take the form of any party wishing to sell fuel; a fuel cell vehicle or aggregation of fuel cell vehicles; and an energy service provider and/or any party wishing to buy electricity, with such electricity being delivered via an electricity distribution company.

Alternatively, the fuel cell powered vehicles may optionally have on-board inverters to convert DC power to AC power. Practically, it is expected that many fuel cell powered vehicles will have inverters, as there are advantages to using AC motors in vehicles, which necessitates inversion of the DC output from a fuel cell power unit to AC. In this scenario, DC power is produced and inverted to AC on-board the vehicles, prior to passing to the docking stations. The docking stations are then adapted to receive AC power from the vehicles, and where required transform the voltage. AC power flows from the individual docking stations to the aggregation unit to be harnessed. Clearly, in this scenario, it is preferred for the inverters to generate AC power at the same frequency as used on a conventional electricity grid. It will be understood that local codes need to be followed, which often will require protective devices, to protect the grid, and it may be necessary to provide an input to a vehicle inverter to synchronize it with the grid.

In a first embodiment, the present invention relates to a method for enabling the real time buying and selling of electrical power between at least one fuel cell power unit, which can be a stationary power unit or a power unit of a vehicle, and an energy service provider. The method comprises providing a docking station, which has connections to the fuel cell powered vehicle for the supply of a fuel and for transfer of electricity to the power grid. The method further comprises determining the current cost of fuel and price paid for generating electricity. Based at least on the cost of fuel and price paid for generating electricity, the method further comprises determining whether to make the fuel cell powered vehicle available for generation of electricity. In cases where the fuel is consumed by the vehicle and electricity generated by the vehicle, the method further comprises collecting data on the quantity of fuel consumed and amount of electricity generated, calculating the cost of the fuel and the value of the electricity generated, and providing a debit charge for the cost of fuel consumed and a credit charge for the value of electricity generated. This and other aspects of the invention envisage that the docking station could either be a public docking station, e.g. in a public parking facility, or a private docking station, e.g. at someone's residence.

In the near future, it is expected that emission credits will become a valuable commodity. Emission credits may be awarded to energy producers who generate minimal pollutants. Accordingly, these credits can be sold to traditional energy producers, i.e. coal producers or, coal-fired power stations and the like, in order to subsidize 'clean' power production. These emission credits can be taken into account when determining whether it is economic to produce electricity. Moreover, the emission credits can be accounted for through metering and billing.

In a second alternative embodiment, the method is the same as the first embodiment except as described below. In this scenario, the energy service provider pays each fuel cell vehicle a flat fee in return for the usage of the fuel cell for a set number of hours per day. Accordingly, the energy service provider deals directly with the fuel gas suppliers and the consumers of electricity and decides whether or not to make the vehicles available for energy production.

These systems and methods provide for an efficient energy market by providing real time communication between all of the participants. This method and system of communication saves time, money and considerable effort by eliminating the need to separately negotiate numerous individual contracts Thus, these systems and methods provide complete turnkey solutions for this unique distributed energy system. Specifically, the systems and methods of this invention provide: proper metering and billing for fuel and energy actually used; timely and accurate communication between all of the network users; availability of unbiased information to all of the participants.

The proposed distributed generation system could be monitored and controlled using a network such as the Internet, or other network. This would allow for optimization of the power grid in real time by taking advantage of the fast communication and processing available using this system. For example, each automobile or vehicle as described in this specification could be monitored (while connected, either wireless or wired to the network) and could be turned on when appropriate to supply power at an optimized set point. Safety and operating regimes would be controlled through the network.

A key novel aspect of the present invention is that each car or each stationary fuel cell unit and each docking station would be assigned a unique digital identification, which may be used to meter, report and control the fuel cell operation while, in the case of a vehicle, the vehicle is connected to the docking station, for refueling and transmission of electricity. Communication is effected over the Internet, which can include wireless communication. This digital identification may be in the form of any PKI (public key infrastructure) certificate, which could be encapsulated in a smart card, a hardware key, or a software file located on the onboard computer controller in the vehicle. All network participants will have a PKI digital identification issued to them for the purpose of authenticating and encrypting the communications between the parties.

The vehicle will also be dynamically allocated an Internet IP address, which will allow it to communicate with other entities on the Internet. In traditional network schemes, IP addresses are typically associated with a computer or server connected to the Internet, not a vehicle, or stationary power generation plant. However, by linking all cars and stations to the network, it becomes possible to treat the overall fleet of cars and stations connected to both the grid and the network as a meta-network of energy, similar to the meta-network of information of the traditional Internet.

This meta-network intelligence of fuel cell energy grids through the Internet will offer many advantages. For instance, it will reduce the probability of overloading the transformers, and allow for the distribution and transmission of overloads to other docking stations. Other advantages are described below.

In a particular embodiment, for instance, the car's unique identification allows the association of an efficiency and power rating to a particular session, so that real time optimization of the power grid could occur, by modulating individual car's generation or by modulating car clusters' generation. In this fashion, for instance, only the highest efficiency power sources would be used at any one time and take into account costs.

Also, through the assignment of digital identifications and IP addresses to vehicular fuel cells and to docking stations, real-time pricing, location-based pricing, and trading of both electricity and the fuel source can occur. Network communications can allow for secure transaction and for uniquely identifying economic agents during a docking session, for metering, controlling and for ulterior billing and payment to the owners of fuel cell cars, parking lots, adjacent businesses and residences or energy providers.

In North America and elsewhere, it is being recognized that, for the distribution of various standard utilities (e.g. gas, electricity, water, telephone services and the like), the costs of distributing the services and collecting payments from the users and the like can be separated from the actual physical supply of the service. For example, in many jurisdictions, electricity supply services are being broken down into separate elements, provided by different companies or entities. There can be one company actually operating power plants to generate electricity and a second company operating fixed distribution groups. Further, there can then be energy service providers, who purchase electric power in bulk and provide adequate remuneration to the operators of the generating stations and the distribution groups. These distribution companies then resell the electricity, at the retail level, to individual industrial and residential consumers. The theory behind the scheme is that standard competition in the market place will cause distribution companies to drive down costs and offer end consumers the best possible price for electricity consumed. It also encourages distribution companies to be creative in pricing schemes, and quite possibly individual distribution companies may target different markets. For example, some distribution companies may target larger, industrial consumers, others may target residential consumers, while yet other distribution companies may, for example, offer special schemes that offer varying pricing over a 24 hour cycle, designed to appeal to a particular group.

Energy deregulation should increase the liquidity of electricity in the marketplace. As the energy market expands, longer term trading, shorter term trading, and peak trading will likely occur. As deregulation increases into a more distributed generation environment with individuals, companies, and other single point power generators generating and selling power, the electricity market will gain breadth and depth, thus allowing for trades of more flexible size, term, and specification.

As noted, such a separation of business activities has been adopted for many utilities. As a further example, for many North American customers of telephone services, their actual telephone will be connected by a single line to a standard telephone network, yet the customer has the choice of buying telephone services from a number of suppliers.

In the electricity industry at least, this has resulted in a radical change in the buying and selling of electricity. Conventionally, a consumer of electricity purchased electricity from a vertically integrated company, which often was in a regulated, monopoly situation. The supply company would operate both the generating plant and the distribution network and would supply electricity at a fixed rate, which due to monopoly considerations was often regulated by government. Due to this rigid structure and the fact that conventional electricity generating sources are inflexible, electricity prices were typically fixed for long periods of time, e.g. of the order of months or years. It has always been well known that electricity demand fluctuates throughout the day, and will vary between a weekday and a weekend for example. To allow for this, some electricity supply companies would offer incentives intended to try to smooth out demand. For example, industrial users and the like would be encouraged to move more demand to nighttime hours when demand is traditionally low. This has resulted in variation in rates between, for example daytime and nighttime, but nonetheless such rates would be fixed for periods of the order of months. This recognizes the fact that conventional, large turbo generator sets require many hours to start up and run down, and a large part of installed generating equipment is incapable of rapid, short term response to changing demand in electricity. These factors have contributed to electricity pricing being rigid and inflexible.

Nonetheless, recent changes in the electricity industry have resulted in a dramatic change in the way in which electricity is sold. At least in the United States of America, there is a market for real time trading in electricity supplies. This occurs, despite the fact that most electricity is still generated by large, fixed power plants, incapable of rapid response.

In accordance with the present invention, it is understood that an energy service provider can be an energy commodity broker, and can assume the commodities risk associated with energy trading. The energy service provider often takes speculative positions, either being long or short on a specific energy commodity.

In accordance with one aspect of the present invention, there is provided a system for enabling the real time buying and selling of electrical power between a fuel cell powered vehicle and a consumer of electricity, the system comprising:

vehicle connections arranged to cooperate with the vehicle for the supply of a fuel to the vehicle and for transfer of electricity to and from the vehicle;

a calculating device for determining the current cost of fuel and price paid for generating electricity using data and information received by the calculating device via a network of a network communication system; and based at least on a cost of fuel and a price paid for generating electricity, for determining whether to make the fuel cell powered vehicle available for generation of electricity by performing one or more calculations based on the data and information received via the network; and a controller for regulating the process of consumption of fuel by the vehicle and the generation of electricity by the vehicle based on the determining by the calculating device;

wherein, when fuel is consumed by the vehicle and electricity is generated by the vehicle, the calculating device further collects data on the quantity of fuel consumed and the amount of electricity generated, to calculate the cost of the fuel and the value of the electricity generated, and to provide a debit charge for the cost of fuel consumed and a credit charge for the value of electricity generated, thereby accounting for fuel consumed and electricity generated by the vehicle; and wherein the network communication system provides real time communication between at least the fuel cell powered vehicle and the consumer of electricity to facilitate the real time buying and selling of electrical power.

In accordance with a second aspect of the present invention, there is provided a system for enabling the real time buying and selling of electrical power between a vehicle having a fuel cell power unit and an energy service provider utilizing a network of a network communication system adapted for providing real time communication between at least the vehicle and the energy service provider to facilitate the real time buying and selling of electrical power, the system comprising:

connections to at least one vehicle for the supply of a fuel and for transfer of electricity;

a controller on each vehicle for handing over control of the fuel cell power unit of each respective vehicle to the energy service provider, to enable the energy service provider to make determinations of when to operate the fuel cell power unit of each vehicle and to set the load level for each fuel cell power unit using data and information received via said network;

and wherein each controller is further adapted to controls the process of consumption of fuel by each respective vehicle and the generation of electricity by the respective vehicle based on the determinations made, and to collect data on the quantity of fuel consumed and amounts of electricity generated, when fuel is consumed by each respective vehicle and electricity generated by each respective vehicle, and for calculating the cost of the fuel and the value of the electricity generated, thereby accounting for fuel consumed and electricity generated by the respective vehicle.

In accordance with a third aspect of the present invention, there is provided a system of generating electrical power utilizing fuel cell power units of vehicles, the system comprising:

connections to a plurality of fuel cell powered vehicle for the supply of a fuel and for transfer of electricity from the vehicle;

a fuel supply associated with each vehicle and a fuel controller to measure and charge for fuel used by each vehicle;

electricity receiving device for receiving electricity generated by each vehicle, wherein the electricity received is paid for at a first, interruptible rate; and an aggregation unit for aggregating the electricity generated by the plurality of vehicles, wherein the aggregated electricity is resold as an uninterruptible electrical supply at a higher, uninterruptible rate.

In accordance with a fourth aspect of the present invention, there is provided a system of generating electricity from the fuel cell power unit of a fuel cell powered vehicle, the system comprising:

a vehicle having a fuel supply;

vehicle connections over which electricity generated in the fuel cell power unit is transferred from the vehicle;

an electricity generation system coupled to the vehicle by the vehicle connections, wherein the electricity generation system is adapted to divides the generated electricity into first and second portions, and permit the first portion of generated electricity to be consumed locally, to transmit and sell the second portion of generated electricity to an electricity transmission and distribution grid; and to meter the net amount of electricity transmitted to the transmission and distribution grid, or taken from the transmission and distribution grid, in a set time period.

In accordance with a fifth aspect of the present invention, there is provided a system of generating electrical power from a vehicle including a fuel cell power unit and financing the cost of the vehicle, the system comprising:

a fuel cell powered vehicle operated by the vehicle operator;

a controller for the vehicle enabling the vehicle operator to enter into a contract providing for at least one of an initial lump sum payment and regular payments to cover at least part of the cost of the vehicle;

wherein the contract provides for the operator to commit to parking the vehicle at selected docking stations for generation of electricity;

a fuel supply for supplying fuel to the vehicle when the vehicle is parked at one of the selected docking stations;

wherein electricity is generated from the fuel cell power unit of the vehicle for sale when the vehicle is parked, to generate income generated from the sale of electricity to cover part of the cost of the vehicle.

In accordance with a sixth aspect of the present invention, there is provided a network communication system for enabling the real time buying and selling of electrical power between a plurality of vehicles, each having a fuel cell power unit and an energy service provider, the system comprising:

a network communication system for providing real time communication between each vehicle and the energy service provider to facilitate the real time buying and selling of electrical power;

a plurality of docking stations, each including connections for at least one vehicle for the supply of a fuel and for transfer of electricity;

a controller on each vehicle for handing over control of the fuel cell power unit of each respective vehicle to the energy service provider, to enable the energy service provider to make determinations of when to operate the fuel cell power unit of each vehicle and to set the load level for each fuel cell power unit using data and information received via said network; comprising:

a network to which a plurality of vehicles and a plurality of docking stations are coupled;

wherein each of the plurality of vehicles comprises a fuel cell unit;

wherein each of said plurality of vehicles and said plurality of docking stations is associated with a unique digital identifier, the unique digital identifier of each vehicle being required for control of the controller thereof; and wherein the identifier facilitates identifying the respective vehicle or docking station in said network.

In accordance with a seventh aspect of the present invention, there is provided a brokerage system for trading electricity, wherein said electricity is generated by one or more fuel cell units, the system comprising:

at least one vehicle being a vendor of electricity, wherein said one or more fuel cell units are operable in said vehicle to generate electricity, said vehicle including an interface enabling one of a vehicle owner and a vehicle operator to negotiate a contract for electricity, said electricity being supplied by said vehicle when coupled to a docking station; and an energy service provider being a purchaser of electricity, wherein said energy service provider obtains said electricity from said vehicle via said docking station and purchases said obtained electricity in accordance with said contract.

In accordance with an eighth aspect of the present invention, there is provided a method for trading electricity, the method comprising:

negotiating a contract for electricity, wherein said electricity is generated by one or more fuel cell units, wherein said one or more fuel cell units are operable in at least one vehicle to generate electricity, and wherein said electricity is supplied by said vehicle when coupled to a docking station;

obtaining said electricity from said vehicle via said docking station; and purchasing said obtained electricity in accordance with said contract.

BRIEF DESCRIPTION OF THE DRAWING FIGURES

For a better understanding of the present invention and to show more clearly how it may be carried into effect, reference will now be made, by way of example, to the accompanying drawings which show a preferred embodiment of the present invention and in which.

DESCRIPTION OF THE PREFERRED EMBODIMENT

The present invention relates to a real time network communication system and method for controlling the generation of electrical power from a plurality of fuel cell powered vehicles. This invention is based on the concept that a fuel cell power unit is capable of generating electrical power efficiently, and moreover, unlike conventional gas engines, the wear and tear from using a fuel cell is quite small. Thus, with suitable financial incentives, it is believed that vehicle owners would effectively be prepared to rent out the power unit of a vehicle simply as an electrical generator, when the vehicle is not in use. This would provide the subsidies necessary to justify the higher initial capital costs of the fuel cell powered vehicle. A further consideration is that fuel cell engines are surprisingly powerful, typically in the range of 20 kw to 85 kw, so that the power of the order of Megawatts would be generated from a small number of vehicles. To enable power to be recovered from a large number of vehicles, the intention is to provide a suitable facility at a parking lot or the like.

Figure 1:
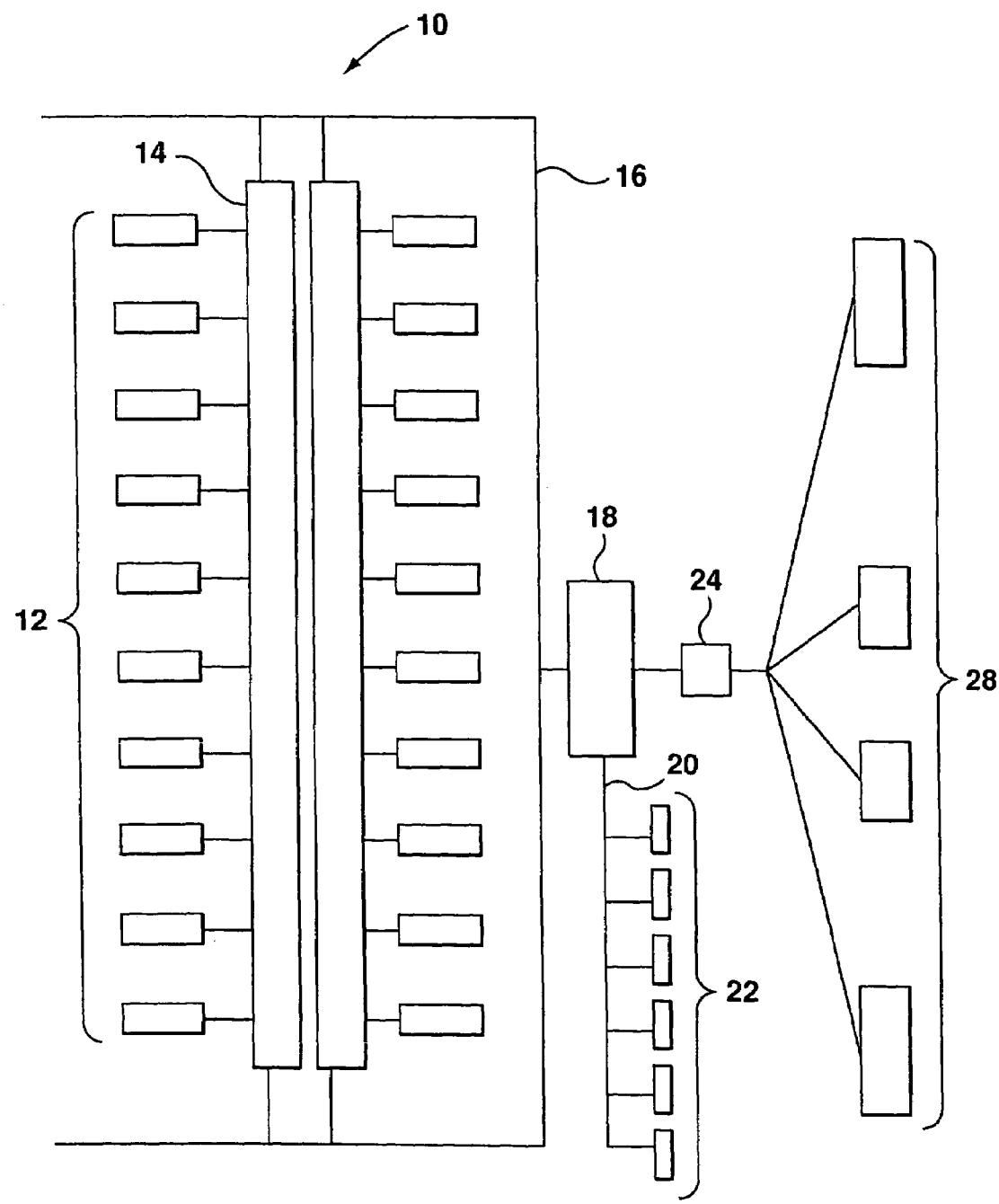
FIG. 1 illustrates a plan of a parking lot adapted to harness and distribute electricity produced by fuel cell powered vehicles.

FIG. 1 illustrates a first embodiment of a parking lot adapted to harness and distribute electricity produced by a plurality of fuel cell powered vehicles 12. A distributed energy system is shown generally at 10. A plurality of fuel cell powered vehicles 12 are shown parked in individual docking stations 14. Each docking station 14 provides connections to the vehicle 12 for the supply of a fuel and for transfer of electricity. A first power grid 16 is integrally connected to the docking stations 14 for collection and transportation of electricity. An aggregation unit 18 is integrally connected to the first power grid 16. A DC power grid 20 could be integrally connected to the aggregation unit 18. Possible DC applications 22 are integrally connected to the DC power grid 20. An inverter 24 is integrally connected to the aggregation unit 18; practically the aggregation unit 18 could administer the fuel power grid 16, the DC power grid 20 and the inverter 24. An AC power grid 26 is integrally connected to an inverter 24 and indicates a conventional power grid. Consumers of electricity 28 are integrally connected to the AC power grid 26.

This configuration assumes that power generated on the vehicles would be taken off the vehicle as DC power. As noted, it may be that it will become standard for vehicles to be fitted with inverters. In such a case, the power would then be taken from the vehicles as AC power, and subsequent inversion would not be required.

Any type of fuel cell powered vehicle can be used in the above embodiment. For example, the fuel cell may be adapted to convert any hydrogen bearing fuel to hydrogen with the use of an on-board reformer. For example, the reformer may convert gasoline, methanol, or metal hydrides into hydrogen rich fuel for use in the fuel cell while the engine is running. However, when the vehicle is parked in the docking station and when a hydrogen supply is available, the normal flow path of fuel can be bypassed by directly connecting the hydrogen supply line to the fuel cell. Thus, in this scenario, the on-board reformer is unused. This makes the docking stations versatile since any type of vehicle can be used. Instead, hydrogen is supplied from docking station 14; in this case, either discrete, individual reformers are provided, or there is a central reformer for all the docking stations 14. Where a hydrogen source is available, a hydrogen distribution system can be implemented to deliver hydrogen gas to individual docking stations. This system will be similar to the natural gas distribution systems that exist today.

While FIG. 1 shows a plurality of docking stations 14, it is to be understood that these could be provided at a variety of locations. They could be at a common, public parking lot. Alternatively, they could be in the common parking lot of a multi-unit dwelling (e.g. an apartment or condominium block), where each vehicle owner has one or more assigned parking places associated with his/her dwelling. Alternatively, one or more docking stations may reside in the garage of a conventional house or residence. Stationary fuel cells located within industrial businesses or residences or the like could also be used to generate electricity for transfer to the grid.

Still referring to FIG. 1, with reference to an individual vehicle 12, a fuel cell powered vehicle 12 is parked in a docking station 14. The vehicle 12 is hooked up to a fuel connection and an electrical connection located within the docking station 14.

When the vehicle 12 is activated and begins producing power, and again assuming DC power is generated, the DC electricity is initially passed to the docking station 14. The DC electricity passes through the first power grid 16, and is collected or pooled into a common source, by the aggregation unit 18. Aggregation unit 18 can be controlled by the energy service provider to send the DC to the DC applications 22, including but not limited to, battery charging, remote or camp sites, industrial factory sites, emergency lighting, telephone service, military, trains, trolley or subways, or welding. Alternatively, aggregation unit 18 can be controlled by the energy service provider to send the aggregated DC power to an inverter 24, where the DC is converted to AC. In known manner, this then permits ready voltage conversion of the power supply for transmission. From the inverter 24, the electricity flows through the power grid 26 to the consumers of electricity 28, including but not limited to, distribution companies, energy service providers, industrial users, individual residences, or the power grid for distant use.

As noted in an alternative embodiment, the fuel cell powered vehicles may optionally have on-board inverters to convert DC power to AC power. In this scenario, DC power is produced and inverted on-board the vehicles, prior to passing to the docking stations. The docking stations are adapted to receive AC power from the vehicles. AC power flows from the individual docking stations to the aggregation unit to be harnessed. The AC power travels directly to the AC grid, or is first transformed to a suitable voltage, for local or distant use.

Figure 2:
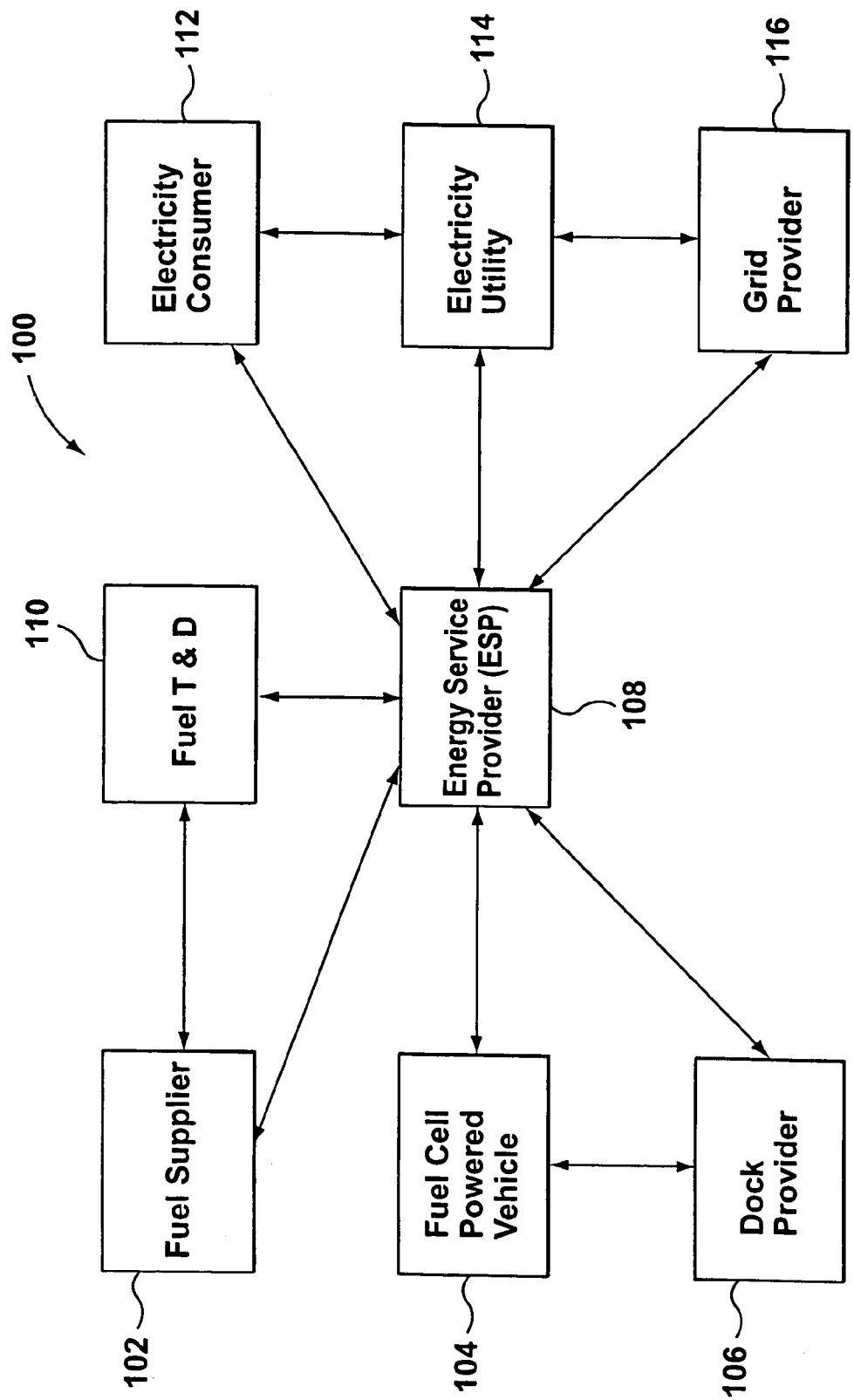
FIG. 2 illustrates a schematic diagram of the real time network communication system.

FIG. 2 illustrates a schematic diagram of a real time network communication system. A network communication system 100 is shown which provides for a real time communication link to at least one fuel supplier 102, at least one fuel cell powered vehicle 104 (equivalent to a vehicle 12 in FIG. 1), a dock provider 106, at least one energy service provider 108, a fuel distributor (or transmission and distribution provider) 110, an electricity consumer 112, an electricity utility 114, and a transmission and grid provider 116 (each also being referred to as a 'system participant'). The system 100 allows real time communications between all of the system participants, allowing both the fuel and energy to be sold in an efficient energy market. The system participants are connected to the network through computers. It will be recognized by those skilled in the art that the types of computers can vary greatly. For example, the computer for the vehicle could be a simple processor, designed for a minimum of manual intervention or input. Alternatively, each computer could also take the form of an embedded controller.

The network 100 could include, but is not limited to, the Internet, a local area network (LAN), a metropolitan area network (MAN) or a wide area network (WAN). It is currently preferred to use the Internet and the associated current standards. The network can include, or solely comprise, both hard-wired and wireless elements. The computers or other processing devices communicate with their respective system participant for receiving and transmitting data and information and for storing the data and information. The data and information includes the fuel supply price offers, the energy supply offers, the operating and maintenance costs, individual fuel cell efficiencies, as well as other parameters. It is expected that each of the system participants will maintain its own database of records necessary at least for its own participation in the generation scheme of the invention. It is also expected that there will be at least one master database, recording information about all transactions in this scheme, and that this will usually be maintained by the energy service provider.

Still referring to FIG. 2, the system participants can simultaneously through the network 100 communicate with each other and have access to the information, stored on a local database or on the master database, for review. It will be understood that, individual system participants may only be given restricted access to certain parts of the master database. Additionally, the system participants can use this accessed information for making informed decisions about potential bids or offers for fuel prices and electricity prices.

Still referring to FIG. 2, there are different types of agreements possible between the system participants. For example, when the fuel gas supplier 102, the fuel cell powered vehicle 104, and the energy service provider 108 all agree on a cost of fuel, a price paid for generating electricity, and a price paid for the supply of electricity, this can be set out in a multi-party agreement, or in separate agreements between the parties. These types of agreements between the system participants become part of the stored information on the master database.

Referring now to FIG. 1, the first embodiment discloses a method, which comprises providing at least one docking station 14, which has connections to the vehicle 12 for the supply of a fuel and for transfer of electricity to the power grid. The method further comprises determining the current cost of fuel and price paid for generating electricity. From the fuel cost, the cost of generating electricity can be calculated and the difference between this and market price for generated electricity is sometimes referred to as a "spark spread". As noted, other factors, e.g. ownership and maintenance costs and emission credits can also be included in the calculation. Based on the "spark spread" calculated at least on the cost of fuel and market price of electricity, the method further comprises determining whether to make the fuel cell powered vehicle 12 available for generation of electricity. As yet a further option, this determination could also include a consideration of the fuel cell efficiency rating of the fuel cell. Alternatively, the fuel cell could be operated at different power levels depending upon the currently available "spark spread", recognizing that the fuel cell runs a different efficiency at different power levels. This is set out in more detail below.

A further, important consideration is who has the authority to decide when to make the fuel cell unit of a vehicle available for generating power. Commonly, it is expected that this will be the vehicle owner. Certainly, where the vehicle is parked at the owner's home, then clearly the owner, who is the owner of both the home and the vehicle, should have control over when power should be generated by the vehicle's fuel cell power unit. However, it is possible that the vehicle owner's control may be limited to simply making the vehicle available for generation. Then an energy service provider, for example, will have control over a large number of vehicles and will make the final decision as to which vehicles to operate and at what power levels.

Where a vehicle is parked or stationary at a parking lot or other facility owned and operated by a parking lot owner, power aggregator and the like, various possibilities are available. Again, the vehicle owner can make a decision on when the vehicle's fuel cell should be turned on. For this situation, and where the vehicle is parked at home, it is anticipated that this will commonly be done by setting an acceptable spark spread either via the Internet or a device on the dashboard. Thus, it is envisioned that the vehicle would be provided with some input device, typically mounted on the vehicle's dashboard, enabling the vehicle's owner and operator to enter acceptable parameters for turning the fuel cell on to generate power. These parameters could be: just the current price paid for electricity; a calculated "spark spread"; other parameters as noted above.

In a parking lot situation and the like, it is conceivable that a vehicle owner could turn over complete control over the operation of vehicle fuel cell unit to an energy service provider, who may or may not be the actual operator of the parking lot. The energy service provider would then have complete control over a large number of vehicles. This gives the energy service provider a considerable advantage in achieving economies of scale and bargaining for electricity supply. In effect, the energy service provider could offer for sale relatively large quantities of power, for example of the order of megawatts.

This should enable economies of scale to be achieved. Aggregation of thousands of units can turn interruptible power into guaranteed uninterruptible power. The concept behind this is as follows: individual units can contract to produce uninterruptible power at a higher price or interruptible power at a lower price. An automotive power source would probably represent an interruptible power source, given that car operators want to drive their cars without limitation. An energy service provider can aggregate many (hundreds, thousands, etc.) of individual car generators at the interruptible price, meaning they pay car owners the interruptible price for power generation. The energy service provider essentially aggregates many interruptible generators into a statistically averaged, uninterruptible power source. Meaning that on average, a certain percentage of automobiles (interruptible power sources) will always be producing electricity over a given time period. For instance, if at all times 70% of automobiles (interruptible power sources) are producing electricity, the energy service provider can contract to sell that 70% of total car generation at the higher, uninterruptible rate. The energy service provider takes the risk of this transaction, but can do so via the power liquidity it aggregates.

The percentage of the total available power generation that an energy service provider actually utilizes will depend on a number of factors. Over time, energy service providers will develop data and statistics, so that they can determine, for example, the likelihood of a certain percentage of the available generating capacity becoming unavailable in a given time period. This will likely vary depending upon time of day, day of the week, seasonal variations and the like. Again for example, available generating capacity at night time, when vehicles are parked in docking stations at homes, apartment blocks and the like, is expected to be extremely predictable; in contrast, the number of vehicles available at a shopping mall may be highly variable and subject to such variables as weather, competing local attractions, etc.

The concept of an aggregated transaction also applies to fuel delivery. It is expected that fuel gas companies will offer much more competitive rates, where an energy supply company contracts to take, in bulk, a relatively large amount of fuel at a fixed rate. The cost of fuel for each vehicle can be justified at a higher rate, as each supply will be a small, interruptible transaction.

The bulk fuel flow can then be divided up and supplied to available vehicles and again, the energy service provider takes some risk but this is reduced by the liquidity of a large number of vehicles. It is possible, indeed likely, that at various times loads to individual vehicles will be varied and/or individual vehicles will be turned on and off as required, while maintaining total gas demand substantially constant. For fuel, this involves splitting an incoming large flow, and hence can be considered as 'disaggregation'.

Where the energy service provider is a separate entity from the parking lot owner/operator, then the energy service provider can sell the electricity to the parking lot owner who could transfer it directly to buildings associated with the parking lot or to the nearby buildings for local use. Alternatively, the energy service provider can sell it on the open market and receive the current market price.

In exchange, the energy service provider could either pay each vehicle owner for the actual electricity generated. Alternatively, a fixed, discounted parking rate could be charged, and the energy service provider would then have discretion to use vehicles available to obtain additional revenue, so as to cover the reduction in parking fees collected.

In one variant, where the energy service provider is a separate entity, the parking lot owner may collect a fixed percentage of all of the electricity sold in exchange for providing and maintaining the docking stations. Alternatively, the parking lot owner may charge a fixed rate on an hourly, daily, weekly or monthly basis. In this way, the parking lot owner does not assume any of the risk typically involved with fluctuating electricity and fuel prices.

It is further recognized that different fuel cells have different efficiency characteristics. Unlike conventional internal combustion engines and the like, fuel cells are actually more efficient when operating at lower power levels. Further, fuel cell efficiencies can change with the age of the fuel cell. Ideally, an energy service provider would have a database available, giving the efficiency characteristics of all the vehicles available in the parking lot. This can either be achieved by having standardized data bases giving efficiency data for standard fuel cells; this assumes that, as for the current market for internal combustion engines, when fuel cells are in wide spread use, there will, at any one time only be a relatively small number of standard fuel cell designs. Alternatively, or as well, the computer operated by the energy service provider can, in real time, calculate the fuel consumed and power generated by each vehicle, to calculate instantaneous efficiencies.

This then should enable the energy service provider to calculate the efficiency and hence cost of each incremental increase in the amount of power generated. This would assume that, for each incremental increase in power, the most efficient fuel cells available are turned on, or fuel cell units not yet operating at maximum capacity would have their power level increased. At all times, the energy service provider would endeavor to turn on or increase the power of the most efficient power source available. In this context, the energy service provider will factor in all variables affecting the price of electricity generated. For example, in a wide spread scheme, fuel costs may vary between vehicles sourcing fuel from different sources, and transmission and distribution costs may vary. In all cases, the energy service provider will endeavor to maximize returns or profits, while generating the required electrical power. Thus, the energy service provider could then calculate, for example, the efficiency and hence cost of increasing power output from, for example, 1 megawatt–1.5 megawatts. In all cases, any real time pricing can be on the basis of prices fixed for a certain period of time, which could be any unit of time, for example days, hours, or fractions of hours. Alternatively, real time pricing can be on the basis of floating prices throughout the day. In such a case, the vehicle owner could either make a commitment to having the vehicle available for a certain period of time, which should command a higher price, recognizing this as uninterruptible power and therefore a reliable source of power. Alternatively, with one or both of fuel and electricity prices fluctuating, the vehicle owner could make the vehicle fuel cell unit available only while a sufficient spark spread is available. Moreover, the method could include providing a computing device and data storage means on the vehicle, storing and continuously updating data in the data storage means relating to the cost of fuel gas and price paid for generating electricity, and using the computing device to calculate continuously whether the vehicle 12 should be made available for generation of electricity. Yet a further option could include providing an input to the data storage means of an acceptable spread between the price paid for electricity and the cost of gas, for making the determination of whether to make the fuel cell powered vehicle 12 available for generation of electricity. In cases where the fuel is consumed by the vehicle 12 and electricity generated by the vehicle 12, the method further comprises collecting data on the quantity of fuel consumed and amount of electricity generated, calculating the cost of the fuel and the value of the electricity generated, and providing a debit charge for the cost of fuel consumed and a credit charge for the value of electricity generated.

FIG. 2 shows the communication schematics of the present invention. Communication can be through a hardwired link, or a wireless network and each system participant or the like would have its own unique digital identification and IP address. More preferably, communication is by means of the Internet, and each system participant and docking station has a unique digital identification.

Additionally, it is preferred to use this facility to identify each fuel cell powered vehicle 104. Thus, each vehicle 104 would have a unique digital identification. This will enable the vehicle to be identified wherever the vehicle is parked or located. Further, this enables accounts for debits for fuel gas used and for credits for electricity generated to be associated with the owner of the vehicle 104.

In a parking lot situation, it is expected that the energy service provider will act as an electricity broker and aggregator and potentially a fuel gas supply broker. In such a case, the energy service provider or aggregator calculates both the debit charge for fuel and the credit charge for electricity, calculates a net credit charge as the difference between said debit and credit charges, while taking some margin, and credits the net credit charge to an account associated with the vehicle 12, determined from the vehicle's digital identification. In this example, the aggregation unit 18 acts as an aggregator for aggregating or pooling electricity generated by a plurality of vehicles 12 into a single electricity source for resale and distribution. Accordingly, in one scenario, the energy service provider or aggregator is controlling the docking stations 14, supplying the fuel gas and receiving electricity generated from the vehicles 12.

The scheme outlined assures that fuel gas would be provided by the energy service provider, i.e. it would not be subject of a direct transaction between the fuel gas supplier and each vehicle owner. Referring again to FIG. 1, in a second alternative embodiment, the method comprises providing connections to at least one vehicle 12 for the supply of a fuel and for transfer of electricity. The method further comprises determining the current cost of fuel and price paid for generating electricity. Based at least on the cost of fuel and price paid for generating electricity, the method further comprises determining whether to supply electricity to the consumer of electricity 28. This aspect of the method further comprises collecting data on the quantity of fuel consumed and amount of electricity generated, and calculating the cost of the fuel and the value of the electricity generated. In this scenario, the energy service provider pays each fuel cell powered vehicle 12 a flat fee for a defined period of time in return for the usage of the fuel cell for a set number of hours per day. This defined period could include, but is not limited to: days, weeks, months or years. Accordingly, the energy service provider deals directly with the fuel suppliers and the consumers of electricity and decides whether or not to make the cars available for energy production.

In an alternative embodiment, the fuel cell powered vehicle owner makes use of the vehicle borne fuel cell and/or a stationary fuel cell located in his residence. Docking stations may optionally be situated at a residence. Thus, when the vehicle owner is at home, the fuel cell can be plugged in to produce power. It is also possible that there is a small reformer located at the residence which can produce hydrogen at off-hours when it is economical to do so. Accordingly, the vehicle borne fuel cell and/or the stationary fuel cell can either be used locally at the residence, or inverted and sold to the grid. If the energy is used locally at the residence, the resident does not have to pay transmission and delivery costs for movement along the grid.

Figure 3:
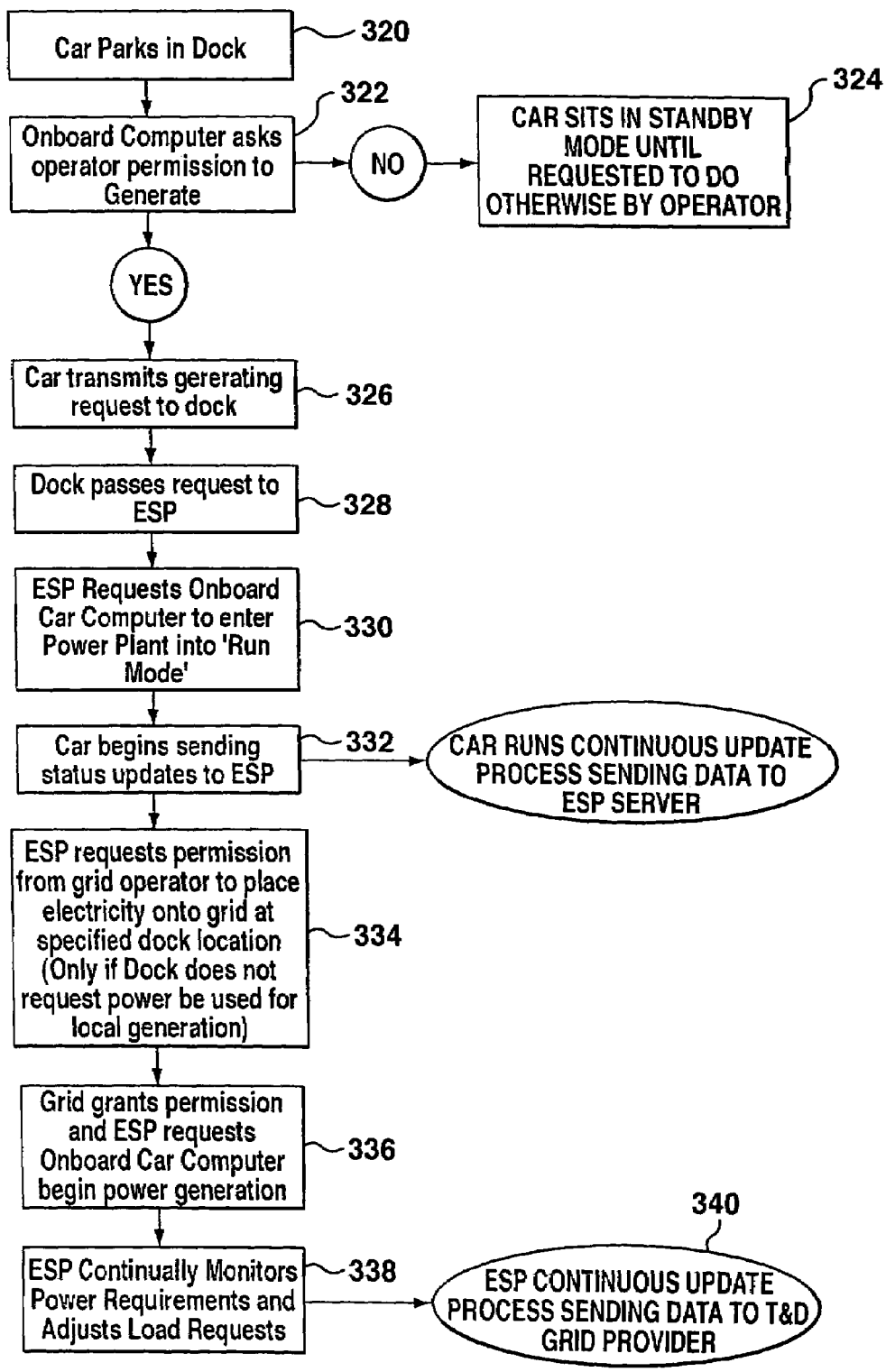
FIG. 3 shows a first flow chart showing steps in the method of the present invention.
Figure 4:
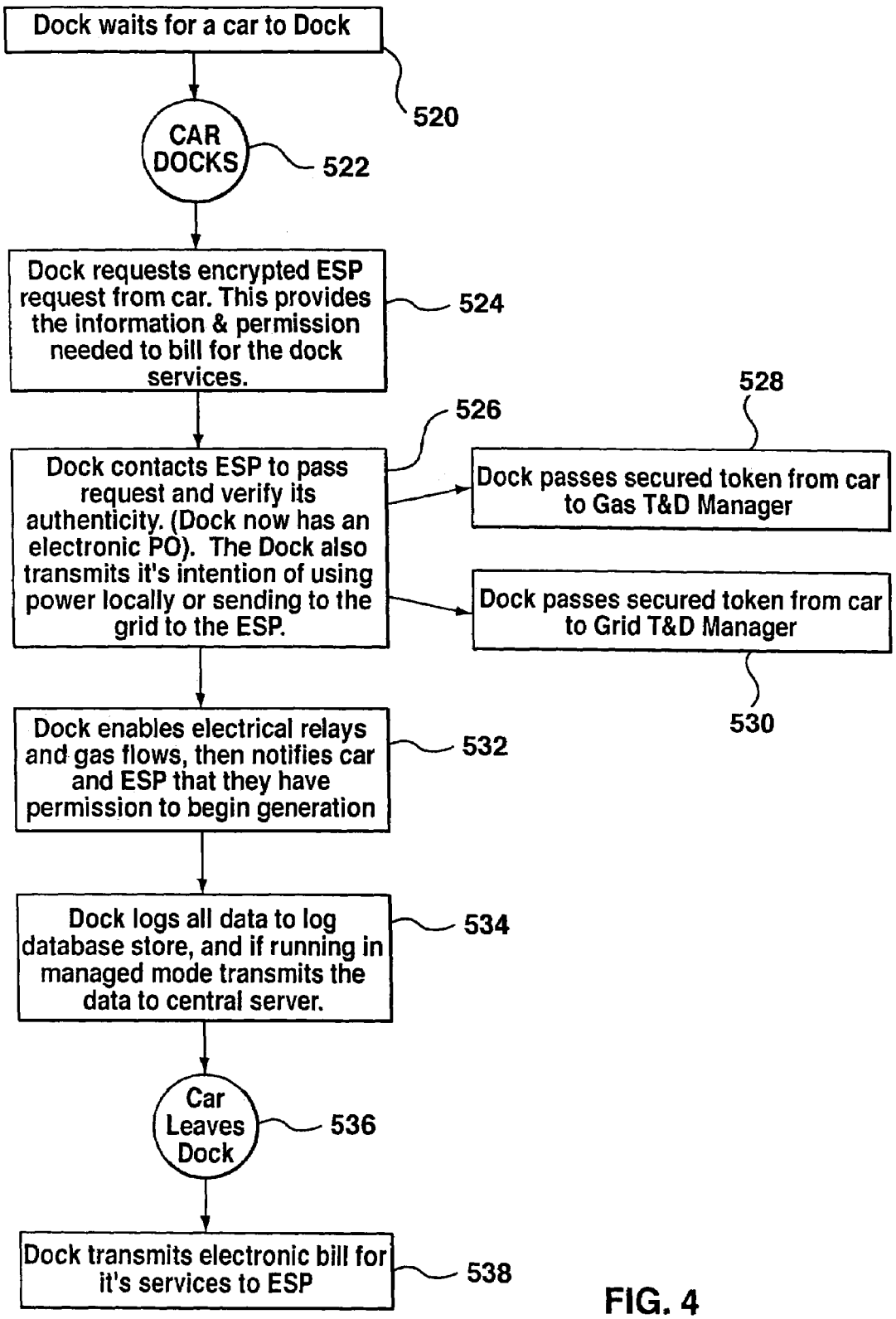
FIG. 4 shows a second flow chart showing steps in the method of the present invention.
Figure 5:
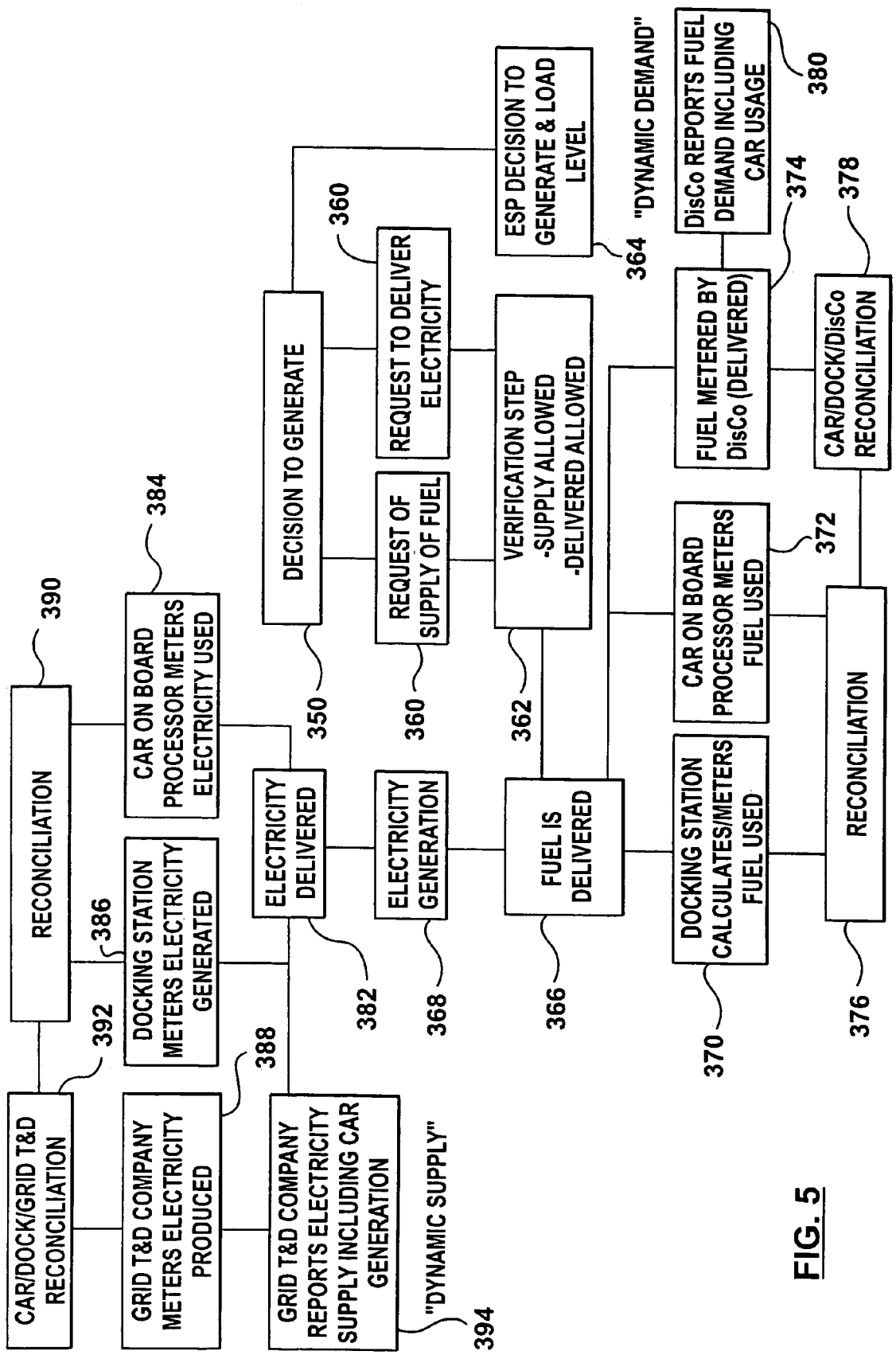
FIG. 5 shows a third flow chart, showing steps in the method of the present invention.

Reference will now be made to FIGS. 3, 4 and 5 which show flow charts indicating typical steps in docking a vehicle and initiating production of electricity, and also to FIGS. 6 and 7, which show details of flow of electricity and fuel in a fully brokered transaction.

Referring first to FIG. 3, this indicates at 320 that the vehicle is parked in a parking dock (14 in FIG. 1). Communication is established with the vehicle and checks are made to ensure that proper connections are established for electricity, fuel gas and where appropriate other connections, such as water and a communications connection (if wireless communication is not used).

With the car properly docked, an on-board computer on the car or the vehicle then asks permission to generate electricity as indicated at 322. This query is directed to the user or owner of the vehicle. Typically, it is expected that this will be a simple action that the vehicle user or driver will take, immediately before leaving the vehicle. On the other hand, this could be a decision that is made and preset for some period of time. For example, if a regular commuter enters into a long term contract with an energy service provider, then there can be a commitment that the vehicle will be available for generating power whenever it is in the parking lot, and this decision would be recorded both by the on-board computer of the vehicle and by communication equipment at the energy service provider, 18, 402 or 410. If no decision is given, then as indicated at 324, the car sits in standby mode until required for use.

If permission is given to generate, then, as indicated at 326, the car anticipates communication with a dock and transmits a generating request to the dock. The car then initiates communication with the energy service provider at 328.

Normally, it is expected that the decision by the vehicle owner/user will be merely permissive, and that the final decision on generation will be made by the energy service provider, and that this decision in turn will depend upon prevailing rates for fuel and electricity. Where these rates are favorable, i.e. there is an acceptable "spark spread" enabling electricity to be generated at a suitable margin of profit, then, at 330 the energy service provider requests the vehicle to enter the power plant into a run mode. At any time, either before or after entering the run mode, the energy service provider can put the vehicle fuel cell power unit into a standby mode, until power is required and other factors, e.g. the 'spark spread' are favorable.

Next, as indicated at 332, the car or vehicle would send continuous status updates to the energy service provider, with this process sending data to the energy service provider's server, this being located either on a computer or a database.

In cases where the dock does not request power to be used locally, the energy service provider requests permission from the grid operator to place electricity onto the grid and then requests a corresponding load to be set by on-board vehicle computer as indicated at 334. The on-board vehicle computer then sets the operating parameters for the fuel cell power plant, to begin power generation 336. Fuel is then supplied to the vehicle, and electricity taken from the vehicle. As detailed below, both fuel and electricity would be metered accordingly. At 338, the energy service provider is shown continuously monitoring power requirements and adjusting electrical load and fuel flow accordingly. As indicated at 340, this information can similarly be sent to one of the databases indicated. Note that the energy service provider can operate the fuel cell at any given power level. As noted, where there are a large number of vehicles available, it is expected that, as power demand fluctuates, the energy service provider will increase and decrease power supplied from individual vehicles, to make best use of available efficiencies from the different vehicles.

Reference will now be made to FIG. 4, which shows another flow chart indicating the decision process of the present invention. This chart illustrates the secure exchange between the participants in this system. Initially, at 520, the dock waits for a car to be plugged into the dock. At 522, the car enters the dock. At 524, the dock requests an encrypted energy service provider request from the vehicle. This provides the information and permission required to bill for the dock services. At 526, the dock contacts the energy service provider to pass the request on and verify its authenticity. Once the request is accepted by the energy service provider, the dock now has an electronic purchase order. Additionally, the dock also transmits its intention of using power locally or sending it to the energy service provider via the grid. At 528, the dock transmits a secured token from the vehicle to a gas transmission and delivery manager (identified as a fuel supplier 102 in FIG. 2). At 530, the dock passes a secured token from the car to a grid transmission and delivery manager (identified as a grid provider 116 in FIG. 2). These secured tokens are simply secured on encrypted notifications from one computing device to another. At 532, the dock enables electrical relays and gas flows, and then notifies the vehicle and energy service provider that they have permission to begin electricity generation. At 534, the dock logs all data into the database for storage, and if it is running in managed mode, transmits the data to the central server. At 536, the vehicle leaves the dock. At 538, the dock transmits an electronic bill for its services to the energy service provider.

Reference will now be made to FIG. 5, which shows another flow chart indicating the decision process of the present invention. As for FIG. 3, a vehicle is first docked in the dock 14, and again checks are made to ensure that the vehicle is properly docked. A decision to generate, indicated at 350 is then made, and again this would be by the owner/operator of the vehicle. Then, in response to generate a certain power level, as received from an energy service provider indicated at 364, a load or power level is set.

As indicated at 350, this decision to make the vehicle available for generation is then communicated to the energy service provider, as requests for supply of gas and requests to deliver electricity at 360. These requests are communicated to a decision block indicated at 362 for verifying that the vehicle should indeed be operated to supply electricity. From decision block 364, the energy service provider supplies a decision as to whether or not the vehicle is to be turned on, and the load level to be set for the vehicle. It will be recognized that this load level can be varied continuously.

When a vehicle is to be turned on, appropriate data is sent to block 366 for supply of an appropriate flow rate of gas. Hydrogen is then delivered, to generate electricity, indicated schematically at 368.

To ensure accurate metering of gas, and to provide independent records for all the parties involved, the gas is metered three separate times. Thus, the docking station 14 continuously meters gas used at 370. The car itself is provided with an on-board meter and processor, shown at 372, for metering the gas, and similarly the gas distribution company meters gas delivered at 374. Hydrogen gas is delivered to the fuel cell for consumption.

In one embodiment, the parking lot owner receives a hydrogen containing fuel and must reform it prior to supplying to the fuel cells of a vehicle. In effect, in the schematic of FIG. 5, a reformer would be provided between the block 366 indicating fuel delivery and electricity generation indicated at 368. Then, the parking lot owner would also charge for reforming the hydrogen containing fuel. Alternatively, the parking lot owner may charge for electrolyzing water so as to generate hydrogen. In a second embodiment, the parking lot owner may provide docking stations which are hooked up to a hydrogen supply network. In this embodiment, the owner of the hydrogen supply network may charge a fee for distributing the hydrogen to the fuel cell powered vehicles in the docking station. In a third embodiment, the vehicle may have an on-board reformer, which reforms a hydrogen containing fuel, for example methanol, into hydrogen prior to being supplied to the fuel cell of the vehicle.

Through use of the network 118, the amount of gas metered by the docking station at 370 and the vehicle at 372 are reconciled at 376. This reconciled amount is then further reconciled at 378 with the metered amount recorded by the gas distribution company. At 380, the amount of gas used will be reported by the distribution company, including the reconciled figure from 378.

The reconciliation function would be carried out continuously and in real time. This has three purposes. Firstly, if there is a breakdown or error in any of the metering equipment, this will show up as an error in reconciliation. The reconciliation processes will be set, in known manner to require reconciliation within acceptable tolerances. If these tolerances are not met, then operation of that particular vehicle is shut down. A further reason for reconciliation is to identify any faults or leaks in the system. For example, extreme discrepancies between metering at two different points may be indicative of a serious gas leak, and for this reason, any reconciliation error will prompt an immediate shut down of gas supply and triggering of an alarm. Additionally, the main purpose of the reconciliation function is to ensure accurate billing. This is a crucial element in the business method.

Turning to the generation of electricity, as indicated at 382, the generated electricity would be delivered to an energy supply company or the like as described above. As for the supply of gas, the electricity generated would be metered or monitored at three separate locations. Thus, an on-board meter on the vehicle or car would meter the electricity generated, as indicated at 384. At 386, the docking station has a meter which also meters the electricity generated, and correspondingly, at 388 the energy supply company or the like would also meter the electricity generated. This is indicated here as a grid transmission and distribution company. Practically, it would be the first entity which receives the electricity from the docking station. In known manner, where electricity is transferred from one entity to another, there would usually be metering by both parties, to ensure accurate recording of the amount of electricity actually transferred.

As for the scheme for metering the fuel gas supplied, reconciliation steps are provided at 390 and 392, for reconciling the three separate metering operations. Provided these reconciliation actions indicate that measured amounts are within acceptable tolerances, then electricity generation is permitted to continue. If there is any significant discrepancy, then operation of the vehicle would be shut down. As for the fuel metering, this again is for three reasons: firstly, there would be no way of knowing which meter is giving the correct readings; secondly, a discrepancy could be an indication of a significant electrical problem, e.g. a fault resulting in a significant drain of electrical current; lastly, accurate billing is crucial to the system functioning properly.

Finally, at 394, the entity receiving the generated electricity from the docking station, whether this be a grid transmission distribution company, an aggregation unit or the like, would report the amount of electricity generated to the owner of the vehicle and to all of the participants.

Figure 6:
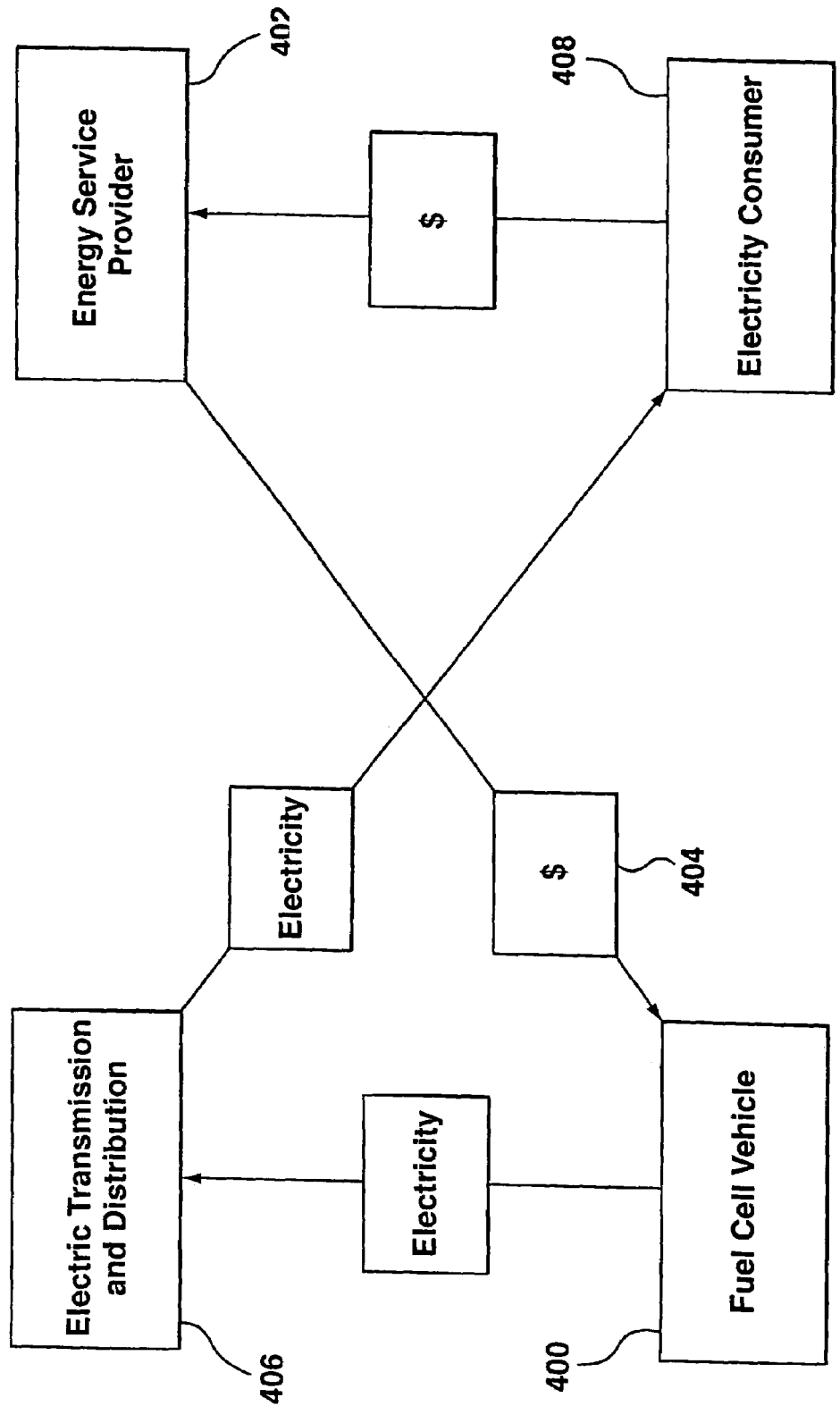
FIGS. 6 and 7 show schematically transactions occurring for purchase of fuel gas and sale of electricity, in a full-brokered transaction.
Figure 7:
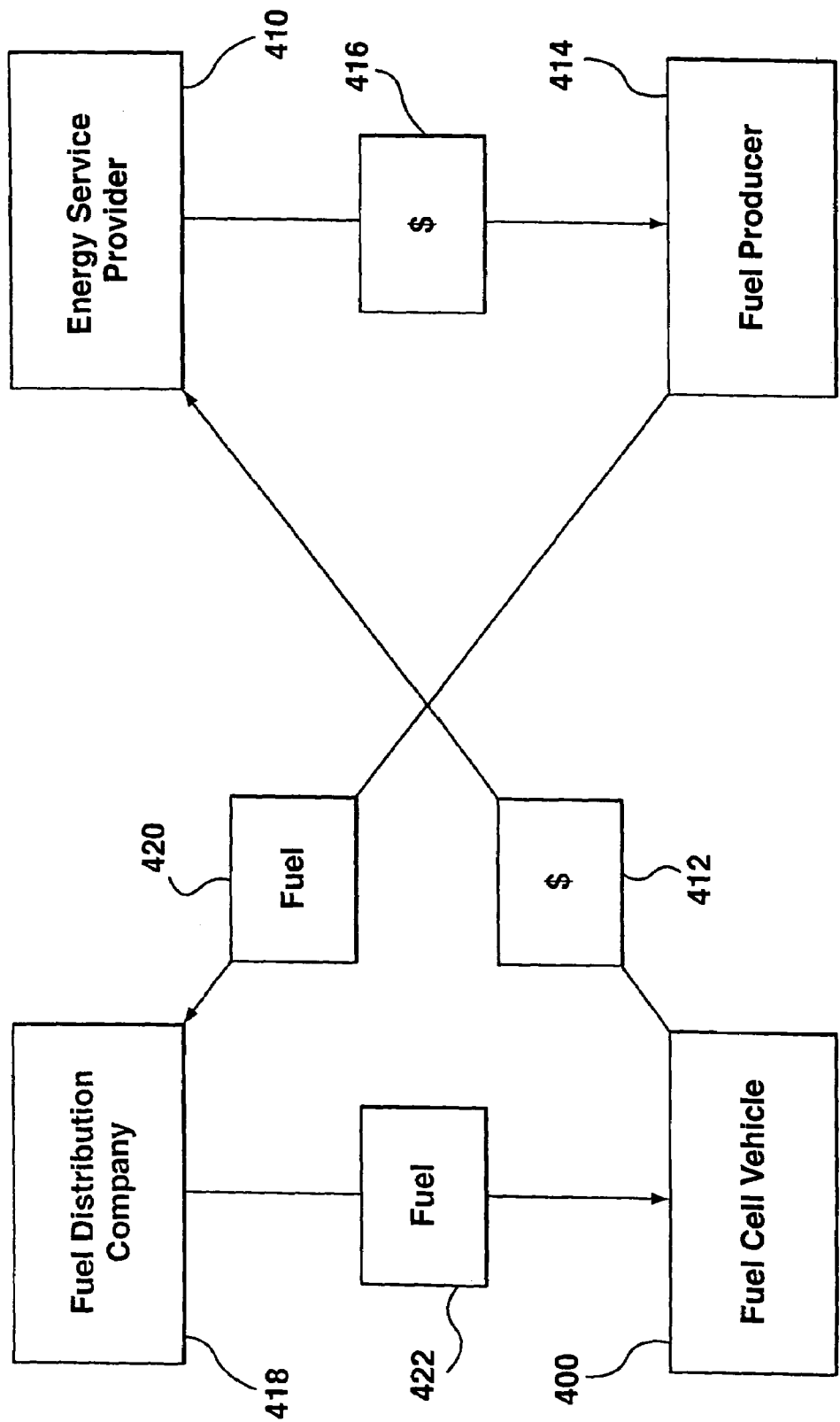

Reference will now be made to FIGS. 6 and 7, which show details of flow of commodities (electricity, fuel and monitoring payment) for a full-brokered transaction, i.e. where both the purchase of fuel and the distribution of electricity are brokered by the energy service provider.

Referring first to FIG. 6, this shows schematically the transactions in selling electricity. A vehicle or car is parked at 400 and negotiates with an energy service provider 402 to sell electricity at a fixed or floating price, as indicated schematically at 404. A fixed price would be a price fixed for a set period of time, while a floating price would simply reflect current rates or could be a price that can be changed at certain set intervals of time. In either case, the contract may require the vehicle to remain permanently connected and to be available for generation within a certain time frame, subject to breakdowns of the vehicle power unit or the like which prevent it from generating electricity. In turn, the energy service provider agrees to buy a minimum, maximum or some other quantity of electricity at the agreed fixed or floating price.

A decision to generate electricity can be made either by the vehicle owner or the energy service provider. Commonly, it is expected that the vehicle owner will make the vehicle power unit available on a permissive basis, i.e. leaving the final decision to the energy service provider. The energy service provider in turn will make a decision on whether to generate electricity depending upon prices for which the energy service provider can resell the electricity.

When electricity is generated, it is expected that commonly it will be first delivered to electricity transmission and distribution lines, indicated schematically at 406. Through these transmission and distribution lines 406, the electricity is delivered to a client or electrical consumer 408. With respect to financial transactions between the consumer or client 408 and the energy service provider 402, once the energy service provider 402 has committed to purchase electricity from the car or vehicle 400, the energy service provider 402 is "long" electricity, because the energy service provider is committed to purchasing electricity with, at that time, no customer for the electricity. Accordingly, the energy service provider sells the electricity to the brokerage client, the client or customer 408. This avoids the client or customer 408 having to separately source a commodity such as electricity and deal with the management of these commodities. As well, the energy service provider can buy or sell the ownership or title of the commodity, without ever actually physically receiving or delivering the commodity. This type of transaction is used in a similar fashion to a forward or futures contract, whereby the contract is used for speculative or hedging purposes.

As indicated, ownership of the electricity is transferred via the transmission and distribution lines 406. A transmission and distribution company will notify the brokerage client 408 of the electrical quantity delivered. As indicated above, there can also be separate metering operations, which can all be reconciled, to ensure accurate metering and billing of electricity. Thus, the client 408 can separately meter the electricity and report to the energy service provider 402. The vehicle 400, and likely also a docking station for the vehicle 400 (not shown in FIG. 6) can also meter the electricity for reconciliation and checking purposes.

The transmission and distribution company owning the transmission and distribution lines 406 will collect the transmission fee from either the energy service provider 402 or the vehicle owner 400. Therefore, the energy service provider balances the receipt of the electricity onto the transmission and distribution lines with delivery to the brokerage client 408.

Reference will now be made to FIG. 7, which shows corresponding transactions of the fuel side. Here, the vehicle or car is again indicated at 400. The energy service provider is now indicated at 410, but it should be understood that the energy service provider in FIG. 6 or 7 could be the same entity, for reasons given below.

As for the electricity, the vehicle 400 enters into a contract with an energy service provider 410 to buy fuel for power generation. Again, this can be at a fixed price for a set period of time or a floating price. Accordingly, it is expected that a vehicle owner will find it desirable to have corresponding terms in the two contracts for purchase of fuel and sale of electricity. For example, if both are at a fixed price for the same time periods, then this gives the vehicle owner complete certainty as to the "spark spread" for generation of electricity. On the other hand, where a vehicle owner can accept a degree of risk, he or she may believe that a better spark spread can be obtained, on average, by accepting floating prices.

In turn, the energy service provider agrees to sell a minimum, maximum or some other quantity of fuel at the fixed or floating price. When market conditions, e.g. fuel price, electricity price and the like, are such that electricity generation is economic, a decision will be made to generate electricity, as detailed above.

When electricity is generated, the energy service provider 410 is required to supply fuel to the car 400, and the energy service provider will then be in a "short" position. Accordingly, the energy service provider 410 buys fuel gas from a fuel producer 414, with payment indicated at 416.

Physical fuel transfer involves a fuel producer 414 transferring the gas to a fuel distribution company 418, as indicated at 420. The distribution company 418 then supplies the fuel, as indicated at 422 to the vehicle 400. If required, a payment can be made to the distribution company 418, for distribution activity, with payment usually being made by the vehicle owner 400 or energy service provider 410 (neither shown).

With fuel delivered to the car 400, electricity is generated. Again, fuel can be metered at appropriate points with reconciliation as indicated above. Thus, fuel usage can be metered by both the producer 414, the distribution company 418 and by the vehicle 400. Additionally, it is expected that a separate docking station, to which the vehicle 400 is connected, will meter the fuel. These various measurements can be reconciled. For reconciling both electricity and gas consumption, the network 118 is used.

The vehicle 400 notifies the energy service provider of physical receipt of fuel and the energy service provider 410 will make a final balance between physical delivery of fuel, as reported by the producer 414 and receipt fuel, as reported by the vehicle 400. A payment is then made by the vehicle owner 400 to the energy service provider 410, typically by a debit from an appropriate account.

Where the energy service providers 402 and 410 are one and the same entity, i.e. one energy service provider both supplies fuel and purchases electricity, then the energy service provider would typically calculate the net credit, i.e. the so called "spark spread" between the value of electricity generated and the cost of fuel gas consumed. Optionally, the operating expenses may be factored into the calculation of the 'spark spread'. This credit would then be paid to an account associated with the vehicle 400.

In most cases, it is expected that payment for electricity generated will be to an individual, company or other entity that owns each individual vehicle 400. It is to be appreciated that, it is quite common for individuals and businesses to lease vehicle from leasing companies. Thus, the person operating the vehicle on a daily basis may not actually own the vehicle, but typically is obligated to make lease payments over a fixed period of time, typically in the order of a few years.

The ability of a fuel cell power unit to generate income can be incorporated into a lease agreement. Thus, a lease agreement could require that a vehicle be parked at certain specified locations, e.g. major public parking facilities where commuters would routinely park, for certain minimum periods of time, so as to make the vehicle available for power generation. Then, credit for power generated would be payable to the leasing company, and these payments would serve as part payment for the lease of the vehicle. The operator of the vehicle then takes no part in any of the transactions involved in generation of electricity, but would enjoy the benefit of a reduced lease rate.

Other possible transactions are a one side brokered transaction. In this case, only one of the fuel gas and the electricity is similar to the fully brokered transaction indicated schematically in FIG. 5 and in the combination of FIGS. 6 and 7. The other side, either the purchase of fuel or the sale of electricity would be a decision of the vehicle owner or operator. The vehicle or the operator would then have to deal directly with a seller of gas or purchaser of electricity, as the case may be, and ensure that the spark spread for generation of electricity is acceptable.

Another possibility is an aggregated transaction. In this case, a number of car owners are aggregated by any one of an energy service provider, a parking lot owner, facility owner, a leasing company, a property company or another party, here designated the aggregator. In the case of an energy service provider, aggregation can be on the order of a handful of vehicles to thousands of vehicles. In the case of a parking lot owner, the aggregation would be of all vehicles parked at a common facility, or a group of associated facilities. In the case of a leasing company, the physical location of the vehicle will be less critical, although commonly it is expected that the leasing company may require vehicles to be parked at certain locations, such as public parking facilities, where the leasing company has made prior contractual arrangements concerning costs. The aggregator can take the risk of commodity transactions, much like the energy broker(s) did in the fully brokered transaction. In this fashion, the aggregator buys fuel and sells electricity into the open market. The aggregator can divert electricity generation to an adjacent facility, as the facility's primary source of electricity. For example, large office buildings and the like commonly have a parking lot associated with them, and electricity generated in that parking lot can be used as electrical power for the building, thus avoiding payments to intermediaries, such as transmission and distribution companies. The aggregator can send electricity to another facility associated with a particular docking station and/or a transmission grid depending upon market conditions.

The aggregator can initiate net-metered transactions for the facility, i.e. the net of electricity drawn from the grid and electricity supplied to the grid. This is applicable when a facility is primarily powered by electricity from the grid with backup by fuel cell powered vehicles and/or stationary fuel cells. When the aggregator finds it economic, it can feed power back onto the grid to decrease the cost of electricity. Additionally, the peak power factor can be corrected by feeding electricity back onto the grid with an appropriate phase angle between the voltage and current. The additional current then puts the current and the voltage back in phase, thus making the net transmission of the electricity to the facility more efficient. In an alternative embodiment, the aggregator can use the power locally, either in DC form or by inverting it (if required) and using it as AC.

The aggregator can analyze the spark spread, market price and other factors, e.g. operating or maintenance costs, to determine when to activate vehicles for electricity generation. The aggregator would utilize the energy infrastructure in the same fashion, as would the energy service provider in the full-brokered transaction.

Car powered electricity generation can be utilized in various ways. They can be used to meet the base load of a facility, peak loading, or it can be both of these loads. Alternatively, it can meet both loads and have access capacity to sell back to the electricity grid. Car powered electricity generation can also benefit utilities that are experiencing generation, transmission and/or distribution capacity shortfalls. In particular, a short-term shortfall of electricity capacity will often generate exceptional spikes in the price paid for electricity, which can make car powered electricity generation more attractive. It also can help drive down the customer's energy cost and enhance power reliability and quality.

Reference is made above, at numerous points, to supply of a fuel gas. Ideally, this fuel gas is hydrogen, which can be used directly by a fuel cell. In many cases, the fuel gas will in fact be a hydrocarbon fuel, e.g. natural gas. In such cases, it is necessary to pass the fuel gas through a reformer to generate a fuel gas that can be consumed by a fuel cell. Ideally, in a parking lot situation and the like, this is achieved by providing centralized reformation of fuel, which enables fuel reformation to be effected more efficiently. The reformed fuel, hydrogen, is then supplied to vehicles for consumption.

It is also recognized that generation of electricity by vehicles generates water as a by-product. This water can be collected and stored, for reuse, resale etc. However, it is noted that initially the water will be de-ionized and may need to be treated prior to reuse or resale depending on the intended use.

It is expected that, with developments in fuel cell technology, some vehicles at least will be fitted with regenerative fuel cells. These are fuel cells, which are capable of operating both to generate electricity or to absorb electricity to generate hydrogen from water. Whichever mode a fuel cell is operated in will depend upon conditions and prices available. Thus, when demand is low and electricity prices are low, it may be worthwhile to operate the fuel cell unit of a vehicle in reverse, so as to generate hydrogen. This hydrogen can be stored, for later use or sale to vehicle operators. As indicated above, the calculation of whether to operate a fuel cell unit in a regenerative or reverse mode should include, the current cost of hydrogen and charges for storing hydrogen if applicable.

We claim:

1. A system for enabling the real time buying and selling of electrical power between a fuel cell powered vehicle and a consumer of electricity, the system comprising:
    vehicle connections arranged to cooperate with the vehicle for the supply of a fuel to the vehicle and for transfer of electricity to and from the vehicle;
    a calculating device for determining the current cost of fuel and price paid for generating electricity using data and information received by the calculating device via a network of a network communication system; and based at least on a cost of fuel and a price paid for generating electricity, for determining whether to make the fuel cell powered vehicle available for generation of electricity by performing one or more calculations based on the data and information received via the network; and
    a controller for regulating the process of consumption of fuel by the vehicle and the generation of electricity by the vehicle based on the determining by the calculating device;
    wherein, when fuel is consumed by the vehicle and electricity is generated by the vehicle, the calculating device further collects data on the quantity of fuel consumed and the amount of electricity generated, to calculate the cost of the fuel and the value of the electricity generated, and to provide a debit charge for the cost of fuel consumed and a credit charge for the value of electricity generated, thereby accounting for fuel consumed and electricity generated by the vehicle; and wherein the network communication system provides real time communication between at least the fuel cell powered vehicle and the consumer of electricity to facilitate the real time buying and selling of electrical power.

2. A system as claimed in claim 1, wherein the calculating device determines whether to make the fuel cell powered vehicle available for generation of electricity based also on operating and maintenance costs.

3. A system as claimed in claim 1, wherein the calculating device determines whether to make the fuel cell powered vehicle available for generation of electricity based also on a fuel cell efficiency rating of the vehicle.

4. A system as claimed in claim 1, 2 or 3, wherein the vehicle is one of a plurality of vehicles connected to each other in a system for generating electricity, and wherein the calculating devices of the plurality of vehicles cooperate to set a load level for each respective vehicle, to generate electricity at the lowest possible cost.

5. A system as claimed in claim 3, wherein the vehicle has a computing device and data storage device, wherein data relating to the cost of fuel gas and the price paid for generating electricity is stored in the data storage device, and wherein the computing device is programmed to calculate continuously whether the vehicle should be made available for generation of electricity.

6. A system as claimed in claim 5, wherein the data storage device has an input for receiving data indicating an acceptable spread between the price paid for electricity and the cost of gas.

7. A system as claimed in claim 6, wherein the vehicle has an interface operable by an operator of the vehicle to indicate that the vehicle is available for electricity generation, for setting parameters based on fuel and electricity costs for determining the availability of the vehicle for electricity generation, and for passing control of the vehicle to an energy service provider.

8. A system as claimed in claim 3, wherein the network communication system provides real time communication over the network between the vehicle and the fuel gas supplier, as well as between the vehicle and the energy service provider, to determine the cost of fuel gas by real time pricing between the vehicle and a fuel gas supplier, and to determine the price paid for electricity by real time pricing between the vehicle and an energy service provider respectively.

9. A system as claimed in claim 8, in which one of a vehicle owner and vehicle operator negotiates a contract via the network with at least one of: a fuel gas broker, for supply of fuel gas; and an energy service provider, for purchase of electricity.

10. A system as claimed in claim 9, wherein the fuel gas broker and the energy service provider are a single entity and wherein the negotiated contract is a single contract providing for payment of a net credit to an account associated with the vehicle.

11. A system as claimed in claim 7, the system further comprising:
    a plurality of docking stations for vehicles and a communication connection between the docking stations and an energy service provider, each docking station including connections for the supply of fuel gas to and transfer of electricity from a vehicle;
    wherein the network communication system permits each vehicle operator to transmit to the energy service provider a notification of the availability of the operator's vehicle for electricity generation and any limitations on the vehicle availability determined from fuel and electricity costs over the network and
    to permit the energy service provider to send control signals to individual vehicles to actuate individual fuel cell powered vehicles as requested and to set load levels for individual vehicles over the network, thereby to meet current electrical demand.

12. A system as claimed in claim 11, wherein data is communicated via the network between the energy service provider and the individual vehicles, each vehicle having a unique identification, whereby each vehicle can be uniquely identified, irrespective of the location of the vehicle.

13. A system as claimed in claim 12, wherein the network is the Internet.

14. A system as claimed in claim 13, wherein the network enables both hardwired and wireless communication.

15. A system as claimed in claim 12, wherein the system further comprises an energy aggregating device and wherein the energy service provider acts as an aggregator utilizing the energy aggregating device to aggregate electricity generated by a plurality of vehicles into a single electricity source for resale and distribution.

16. A system as claimed in claim 15, wherein the system further comprises a fuel disaggregating device, so that fuel gas purchased in bulk is disaggregated by the disaggregating device, by charging each vehicle for a portion of the bulk fuel gas used by the vehicle.

17. A system as claimed in claim 16, wherein the energy service acts as a disaggregator utilizing the fuel disaggregating device, the energy service provider purchasing fuel gas in bulk at one rate and charging each vehicle for a portion of the bulk fuel gas used by the vehicle at a second higher rate.

18. A system as claimed in claim 15, wherein the calculating device calculates a rate is set for purchase of electricity from each vehicle at an interruptible rate, to facilitate aggregating electricity generated by the plurality of vehicles by the energy aggregating device to create a substantially uninterruptible electricity supply, so that the aggregated electricity can be resold at a higher, uninterruptible rate.

19. A system as claimed in claim 18, further comprising a system computing device connected to the network communication system programmed to: determine, for any given time period, the number of vehicles that will be available for generating electricity; for calculating a maximum electrical power that could be generated from the vehicles; calculate a likelihood that a certain percentage of the vehicles may not be available for generating electrical power determined from measured data and stored data selected from geographical location, time of day, day of the week and seasonal factors; calculate a marginal power level that would be generated from the certain percentage of vehicles; and subtract the marginal power level from a maximum electrical power, to give a net power level, to determine a reliability factor for the net power level, to enable the offering for sale of generated electricity at the net power level, at a price that takes into account the reliability factor.

20. A system as claimed in claim 15, wherein the energy aggregating device permits at least a portion of the electricity of the single electricity source to be utilized locally, to leave a balance amount of generated electricity for resale and distribution.

21. A system as claimed in claim 20, wherein the vehicles comprise inverters for inverting generated DC power into AC power, and AC drive motors for receiving the AC power, the inverters having at least one frequency that is compatible with a conventional electricity transmission grid.

22. A system as claimed in claim 20, wherein the docking stations are arranged at a single location and connected to a common energy aggregation unit, the common energy aggregation unit connected to local, electricity consuming devices for local consumption of electricity, and through a net metering device to an electricity supply and transmission grid, whereby, for any given time period, the net amount of electricity taken from the grid or supplied to the grid is measured using a measuring device.

23. A system as claimed in claim 15, wherein the network communication system facilitates communication over the network between the energy service provider and one or more of a dock provider that manages the docking stations, a fuel supplier, a fuel transmission/distribution company, an electricity utility for managing supply of electricity to an electricity consumer, at least one electricity consumer, and an electricity transmission grid provider.

24. A system as claimed in claim 12, wherein the data communicated over the network comprises notifications of the availability of each vehicle to a docking station, and from each docking station to the energy service provider;

instructions via the network, when required, from the energy service provider for each vehicle to enter a run mode;

status updates for each vehicle, when in the run mode, to the energy service provider via the network;

requests from the energy service provider to place generated electricity onto the electricity grid at a specified location associated with the docking station;

after receiving permission from the grid, instructions from the energy service provider for individual vehicles to commence electrical power generation via the network; and data used in by the energy service provider to continually monitor power generation from each vehicle and adjust load levels of each vehicle to generate a required amount of electricity via the network.

25. A system as claimed in claim 24, wherein at least one notification communicated from each vehicle to a respective docking station via the network is encrypted, the docking station having a communications device adapted to:

contact the energy service provider to verify the authenticity of the encrypted notification;

pass a first secured token to a fuel transmission and distribution manager and a second secured token to an electricity grid transmission and distribution manager via the network after authentication of the notification;

enable supply of fuel gas to the vehicle and electricity supplied from the vehicle to the docking station via said network;

log all data to a database and transmit data via the network to the energy service provider; and transmit an electronic bill for services to the energy service provider at an end of each generation session.

26. A system for enabling the real time buying and selling of electrical power between a vehicle having a fuel cell power unit and an energy service provider utilizing a network of a network communication system for providing real time communication between at least the vehicle and the energy service provider to facilitate the real time buying and selling of electrical power, the system comprising:

connections to at least one vehicle for the supply of a fuel and for transfer of electricity;

a controller on each vehicle for handing over control of the fuel cell power unit of each respective vehicle to the energy service provider, to enable the energy service provider to make determinations of when to operate the fuel cell power unit of each vehicle and to set the load level for each fuel cell power unit using data and information received via said network;

and wherein each controller is further controls the process of consumption of fuel by each respective vehicle and the generation of electricity by the respective vehicle based on the determinations made, and to collect data on the quantity of fuel consumed and amounts of electricity generated, when fuel is consumed by each respective vehicle and electricity generated by each respective vehicle, and for calculating the cost of the fuel and the value of the electricity generated, thereby accounting for fuel consumed and electricity generated by the respective vehicle.

27. A system as claimed in claim 26, wherein the network communication system further provides real time communication over said network between the energy service provider and at least one fuel gas supplier, to determine the cost of fuel gas by real time pricing via the network between the energy service provider and at least one fuel gas supplier.

28. A system as claimed in claim 27, wherein the network communication system further provides real time communication over said network between said energy service provider and an owner or operator of each vehicle, to set the price paid for purchasing electricity by real time pricing via the network between the energy service provider and an owner or operator of each vehicle.

29. A system as claimed in claim 28, in which one of a vehicle owner and vehicle operator negotiates a contract via the network with at least one of: a fuel gas broker, for supply of fuel gas; and an energy service provider, for purchase of electricity.

30. A system as claimed in claim 29, wherein the fuel gas broker and the energy service provider are a single entity and wherein the contract is a single contract providing for payment of a net credit to an account associated with the respective vehicle.

31. A system as claimed in claim 26, wherein the price paid to a vehicle owner for generating electricity is based on a flat fee for a defined period of time.

32. A system as claimed in claim 31, wherein the defined period of time is chosen from one of the following: day, week, month, or year.

33. A system as claimed in claim 26, further comprising:
   a plurality of docking stations for vehicles and a communication connection between the docking stations and the energy service provider, each docking station including connections for the supply of fuel gas to and transfer of electricity from a vehicle;
   wherein the network communication system permits each vehicle operator to transmit to the energy service provider a notification of the availability of the operator's vehicle for electricity generation and any limitations on the vehicle availability determined from fuel and electricity costs via the network; and
   to permit the energy service provider to send control signals to individual vehicles to actuate individual fuel cell powered vehicles as requested and to set load levels for individual vehicles via the network, thereby to meet current electrical demand.

34. A system as claimed in claim 33, wherein data is communicated via the network between the energy service provider and the individual vehicles, and providing each vehicle with a unique address whereby each vehicle can be uniquely identified, irrespective of the location of the vehicle.

35. A system as claimed in claim 34, wherein the energy service provider acts as an aggregator and aggregating electricity generated by a plurality of vehicles into a single electricity source for resale and distribution.

36. A system as claimed in claim 33, 34 or 35, wherein the system further comprises at least one of:
   a fuel gas meter arranged at the vehicle, or associated docking station and at the fuel gas supplier, and a fuel gas reconciling system for reconciling the different metered amounts; and
   an electricity meter arranged at the vehicle, or associated docking station and an electricity purchaser, and an electricity metering reconciling system for reconciling the different metered amounts.

37. A system as claimed in claim 36, wherein the flow of fuel gas to and generation of electricity by a vehicle is terminated by the respective controller if any reconciliation shows an error outside an acceptable tolerance.

38. A system of generating electrical power utilizing fuel cell power units of vehicles, the system comprising;
   connections to a plurality of fuel cell powered vehicle for the supply of a fuel and for transfer of electricity from the vehicle;
   a fuel supply associated with each vehicle and a fuel controller to measure and charge for fuel used by each vehicle;
   electricity receiving device for receiving electricity generated by each vehicle, wherein the electricity received is paid for at a first, interruptible rate; and
   an aggregation unit for aggregating the electricity generated by the plurality of vehicles, wherein the aggregated electricity is resold as an uninterruptible electrical supply at a higher, uninterruptible rate.

39. A system as claimed in claim 38, wherein the fuel supplied to each vehicle is supplied in bulk at a first rate, and resold in smaller, discrete amounts to individual vehicles at a second, higher rate.

40. A system as claimed in claim 38 or 39, wherein the system further comprises a plurality of docking stations, the docking stations being connected to the aggregation unit for aggregation of electrical power generated from the vehicles, and transmitting means for transmitting the aggregated power from the aggregation unit to an electricity transmission and distribution grid.

41. A system as claimed in claim 40, wherein at least all or some of the electricity generated is utilized locally, and only a balance of the electricity generated is resold and transmitted to the electricity and transmission grid.

42. A system of generating electricity from the fuel cell power unit of a fuel cell powered vehicle, the system comprising;
   a vehicle having a fuel supply;
   vehicle connections over which electricity generated in the fuel cell power unit is transferred from the vehicle;
   an electricity generation system coupled to the vehicle by the vehicle connections, wherein the electricity generation system divides the generated electricity into first and second portions, and permit the first portion of generated electricity to be consumed locally,
   to transmit and sell the second portion of generated electricity to an electricity transmission and distribution grid; and
   to meter the net amount of electricity transmitted to the transmission and distribution grid, or taken from the transmission and distribution grid, in a set time period.

43. A system as claimed in claim 42, wherein the system is located in an individual dwelling.

44. A system as claimed in claim 42, wherein the system further comprises a plurality of docking stations for vehicles, each docking station having a supply of fuel and means for transmission of electricity, the docking stations connected to an aggregation unit for aggregation of generated power, wherein the docking stations transmit aggregated power from the aggregation unit to a transmission and distribution grid, and where a meter is connected between the aggregation unit and the transmission and distribution grid.

45. A system of generating electrical power from a vehicle including a fuel cell power unit and financing the cost of the vehicle, the system comprising:
   a fuel cell powered vehicle operated by the vehicle operator;
   a controller for the vehicle enabling the vehicle operator to enter into a contract providing for at least one of an initial lump sum payment and regular payments to cover at least part of the cost of the vehicle;

wherein the contract provides for the operator to commit to parking the vehicle at selected docking stations for generation of electricity;

a fuel supply for supplying fuel to the vehicle when the vehicle is parked at one of the selected docking stations;

wherein electricity is generated from the fuel cell power unit of the vehicle for sale when the vehicle is parked, to generate income generated from the sale of electricity to cover part of the cost of the vehicle.

46. A system as claimed in claim 45, wherein the contract comprises one of a rental agreement, a purchase agreement, and a lease agreement.

47. A system as claimed in claim 46, wherein the contract provides for regular payments payable at an interval selected from one of weekly, monthly and quarterly.

48. A system as claimed in claim 45, which includes providing in the contract for the operator to commit to having the vehicle parked at said selected docking stations for a minimum amount of time within a prescribed time period.

49. A system as claimed in claim 48, which includes providing for making payments to the operator of the vehicle, when the amount of electricity generated by the vehicle is greater than a set amount within a set period.

50. A network communication system, for enabling the real time buying and selling of electrical power between a plurality of vehicles, each having a fuel cell power unit, and an energy service provider, the system comprising:

a network communication system for providing real time communication between each vehicle and the energy service provider to facilitate the real time buying and selling of electrical power;

a plurality of docking stations, each including connections for at least one vehicle for the supply of a fuel and for transfer of electricity;

a controller on each vehicle for handing over control of the fuel cell power unit of each respective vehicle to the energy service provider, to enable the energy service provider to make determinations of when to operate the fuel cell power unit of each vehicle and to set the load level for each fuel cell power unit using data and information received via said network;

wherein each of the plurality of vehicles comprises a fuel cell unit;

wherein each of said plurality of vehicles and said plurality of docking stations is associated with a unique digital identifier, the unique digital identifier of each vehicle being required for control of the controller thereof; and wherein the identifier facilitates identifying the respective vehicle or docking station in said network.

51. A network communication system of claim 50, wherein said identifier further facilitates at least one of metering operations of the fuel cell unit of the respective vehicle, reporting operations of the fuel cell unit of the respective vehicle, and controlling operations of the fuel cell unit of the respective vehicle.

52. A network communication system of claim 50, wherein said network is the Internet.

53. A network communication system of claim 51, wherein the system dynamically allocates an Internet IP address to each of said plurality of vehicles, for facilitating communications with said plurality of vehicles over said network.

54. A network communication system of claim 50, wherein the unique digital identifier is in the form of a PKI certificate, to facilitate encrypted communications over said network.

55. A brokerage system for trading electricity, wherein said electricity is generated by one or more fuel cell units, the system comprising:

at least one vehicle being a vendor of electricity, wherein said one or more fuel cell units are operable in said vehicle to generate electricity, said vehicle including an interface enabling one of a vehicle owner and a vehicle operator to negotiate a contract for electricity, said electricity being supplied by said vehicle when coupled to a docking station; and an energy service provider being a purchaser of electricity, wherein said energy service provider obtains said electricity from said vehicle via said docking station and purchases said obtained electricity in accordance with said contract.

56. A brokerage system of claim 54, wherein said contract defines one of a fixed or a floating price for electricity obtained from said vehicle.

57. A brokerage system of claim 54, further comprising at least one brokerage client to which said obtained electricity is transmitted.

58. A brokerage system of claim 54, wherein a fuel provider provides fuel to said vehicle for operating said fuel cell units operable therein, said interface further enables one of the vehicle owner and the vehicle operator to negotiate a contract for fuel supplied by said energy service provider to said vehicle when said vehicle is coupled to said docking station.

59. A brokerage system of claim 54, wherein a water service provider further obtains water from said vehicle, said water produced by said one or more fuel cell units, wherein said interface further enables one of the vehicle owner and the vehicle operator to negotiate a contract for water obtained from said vehicle and wherein said water service provider purchases said water in accordance with said contract for water.

60. A method for trading electricity, the method comprising:

negotiating a contract for electricity, wherein said electricity is generated by one or more fuel cell units, wherein said one or more fuel cell units are operable in at least one vehicle to generate electricity, and wherein said electricity is supplied by said vehicle when coupled to a docking station;

obtaining said electricity from said vehicle via said docking station; and purchasing said obtained electricity in accordance with said contract.

61. A method of claim 59, wherein said contract defines one of a fixed or a floating price for electricity obtained from said vehicle.

62. A method of claim 59, further comprising transmitting said obtained electricity to at least one brokerage client.

63. A method of claim 59, further comprising negotiating a contract for fuel, wherein said fuel is supplied to said vehicle when said vehicle is coupled to said docking station, and providing fuel to said vehicle for operating said one or more fuel cell units operable therein.

64. A method of claim 59, further comprising negotiating a contract for water, wherein said water is produced by said one or more fuel cell units, obtaining water from said vehicle, and purchasing said water in accordance with said contract for water.

* * * * *